United States Patent
Dewa

(10) Patent No.: US 10,530,155 B2
(45) Date of Patent: Jan. 7, 2020

(54) DRIVE CIRCUIT FOR SWITCHING ELEMENTS

(71) Applicant: DENSO CORPORATION, Kariya, Aichi-pref. (JP)

(72) Inventor: Tetsuya Dewa, Kariya (JP)

(73) Assignee: DENSO CORPORATION, Kariya (JP)

( * ) Notice: Subject to any disclaimer, the term of this patent is extended or adjusted under 35 U.S.C. 154(b) by 271 days.

(21) Appl. No.: 15/730,120

(22) Filed: Oct. 11, 2017

(65) Prior Publication Data

US 2018/0102649 A1 Apr. 12, 2018

(30) Foreign Application Priority Data

Oct. 11, 2016 (JP) .................... 2016-200176

(51) Int. Cl.
*H02J 3/14* (2006.01)

(52) U.S. Cl.
CPC ........................ *H02J 3/14* (2013.01)

(58) Field of Classification Search
None
See application file for complete search history.

(56) References Cited

U.S. PATENT DOCUMENTS

2004/0125627 A1* 7/2004 Nadd .................. H02M 1/08
363/125
2012/0307540 A1 12/2012 Tagome
2014/0247085 A1* 9/2014 Maruyama ............ H02M 1/088
327/434
2016/0233858 A1 8/2016 Wasekura et al.
2016/0336883 A1* 11/2016 Nakano .................... H02P 6/14
2017/0313197 A1* 11/2017 Yamada ................. B60L 50/51

FOREIGN PATENT DOCUMENTS

JP 2010-171696 A 8/2010
JP 2010-279193 A 12/2010
JP 2011-120330 A 6/2011

* cited by examiner

*Primary Examiner* — Jared Fureman
*Assistant Examiner* — Joel Barnett
(74) *Attorney, Agent, or Firm* — Oliff PLC

(57) ABSTRACT

A drive circuit drives a plurality of switching elements connected in parallel to each other. The drive circuit includes an operating unit that performs first and second switching processes. In the first switching process, under a condition that a first current detection value acquired before next time an on-command is received is determined to fall below a first threshold that is equal to or less than a threshold current, an on-operation target that is used the next time the on-command is received is set to a second switching element. In the second switching process, under a condition that the second current detection value acquired before the next time the on-command is received is determined to exceed a second threshold that is equal to or greater than the threshold current, the on-operation target that is used the next time the on-command is received is set to a first switching element.

11 Claims, 17 Drawing Sheets

DURING DRIVING OF SUHB (MOS)

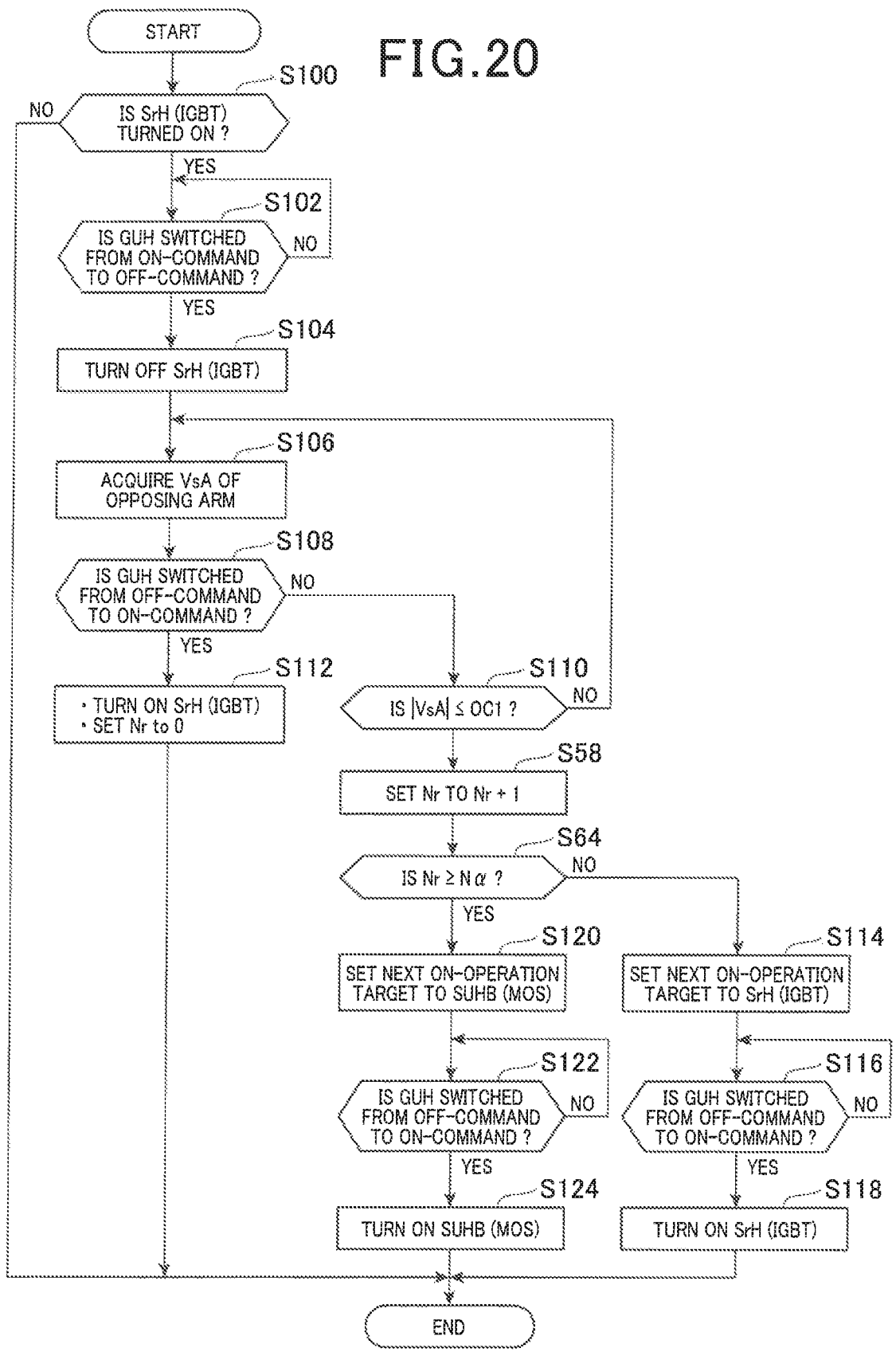

DRIVE CIRCUIT FOR SWITCHING ELEMENTS

CROSS-REFERENCE TO RELATED APPLICATION

This application is based on and claims the benefit of priority from Japanese Patent Application No. 2016-200176, filed Oct. 11, 2016. The entire disclosure of the above application is incorporated herein by reference.

BACKGROUND

Technical Field

The present disclosure relates to a drive circuit for switching elements that drives a plurality of switching elements connected in parallel to each other.

Related Art

For example, as described in JP-A-2011-120330, a drive circuit in which the switching elements to be driven are a metal-oxide-semiconductor field-effect transistor (MOSFET) and an insulated-gate bipolar transistor (IGBT) that are connected to each other in parallel is known as this type of drive circuit. The IGBT has a higher on-resistance than the MOSFET in a low-current region in which the current is lower than a threshold current. The IGBT has a lower on-resistance than the MOSFET in a high-current region in which the current is higher than the threshold current. Therefore, as a result of the configuration in which the MOSFET and the IGBT are connected in parallel, a greater flow of current can be supplied to the switching element that has the lower on-resistance in each current region. Consequently, loss that occurs in the switching elements can be reduced.

Here, a configuration can be considered in which the switching element for an on-operation target is switched between the MOSFET and the IGBT depending on the circumstances. However, in this configuration, the reliability of control performed using the switching elements may decrease unless switching of the switching element for the on-operation target is appropriately performed.

The above-described issue may similarly occur, not only in the configuration in which the MOSFET and the IGBT are connected in parallel, but also in a configuration in which switching elements that have a correlation regarding the magnitude of the on-resistance in each of the low-current region and the high-current region are connected in parallel.

SUMMARY

It is thus desired to provide a drive circuit for switching elements that is capable of preventing decrease in reliability of control performed using the switching elements.

An exemplary embodiment provides a drive circuit for switching elements that drives a plurality of switching elements connected to each other in parallel.

The plurality of switching elements includes a first switching element and a second switching element. The second switching element has a lower on-resistance than the first switching element in a low-current region that is a region in which a current is lower than a threshold current, and a higher on-resistance than the first switching element in a high-current region that is a region in which the current is higher than the threshold current.

The drive circuit includes an operating unit and a current acquiring unit. The operating unit turns on either of the first switching element and the second switching element when an on-command is received, and turns off both of the first switching element and the second switching element when an off-command is inputted. The current acquiring unit acquires a current flowing to the first switching element or a correlation value thereof as a first current detection value, and acquires a current flowing to the second switching element or a correlation value thereof as a second current detection value.

The operating unit performs a first switching process and a second switching process. In the first switching process, if the first current detection value acquired before next time the on-command is received is determined to fall below a first threshold that is equal to or less than the threshold current, an on-operation target that is used the next time the on-command is received is set to the second switching element. In the second switching process, if the second current detection value acquired before the next time the on-command is received is determined to exceed a second threshold that is equal to or greater than the threshold current, the on-operation target that is used the next time the on-command is received is set to the first switching element.

The present exemplary embodiment includes the operating unit that turns on either of the first switching element and the second switching element when the on-command is received, and turns off both of the first switching element and the second switching element when the off-command is inputted. From the perspective of reducing loss, the second switching element that has the lower on-resistance is preferably set as the on-operation target in the low-current region, and the first switching element that has the lower on-resistance is preferably set as the on-operation target in the high-current region.

Here, during the period during which either of the first and second switching elements is turned on based on the current on-command, the value of the current flowing to the switching element that is turned on may change. In this case, the switching element, of the first and second switching elements, to be the on-operation target may be changed to send the current to the switching element, of the first and second switching elements, that has the lower on-resistance. However, when the switching element that is turned on is switched during the period during which either of the first and second switching elements is turned on based on the current on-command, the current flowing to the switching element may vary in accompaniment with the switching. In this case, reliability of control performed using the switching element may decrease.

Therefore, in the present exemplary embodiment, even if a situation occurs in which the switching element, of the first and second switching elements, that is the on-operation target should be changed during the period during which either of the first and second switching elements is turned on based on the current on-command, the switching is performed when the next on-command is received.

Therefore, the operating unit determines whether or not the first current detection value acquired before the next time the on-command is received falls below the first threshold. The operating unit sets the on-operation target that is used the next time the on-command is received to the second switching element, if the first current detection value falls below the first threshold.

Meanwhile, the operating unit determines whether or not the second current detection value acquired before the next time the on-command is received exceeds the second threshold. The operating unit sets the on-operation target that is used the next time the on-command is received to the first switching element, if the second current detection value exceeds the second threshold.

As a result of the present exemplary embodiment described above, the occurrence of current variation accompanying switching of the switching element that is turned on can be prevented. Decrease in the reliability of control performed using the switching element can be prevented.

BRIEF DESCRIPTION OF THE DRAWINGS

In the accompanying drawings:

FIG. 20 is a flowchart of the steps in a switching process; and

DESCRIPTION OF THE EMBODIMENTS

First Embodiment

A first embodiment will hereinafter be described with reference to the drawings. According to the first embodiment, a drive circuit of the present disclosure is applied to an onboard motor control system.

Figure 1:
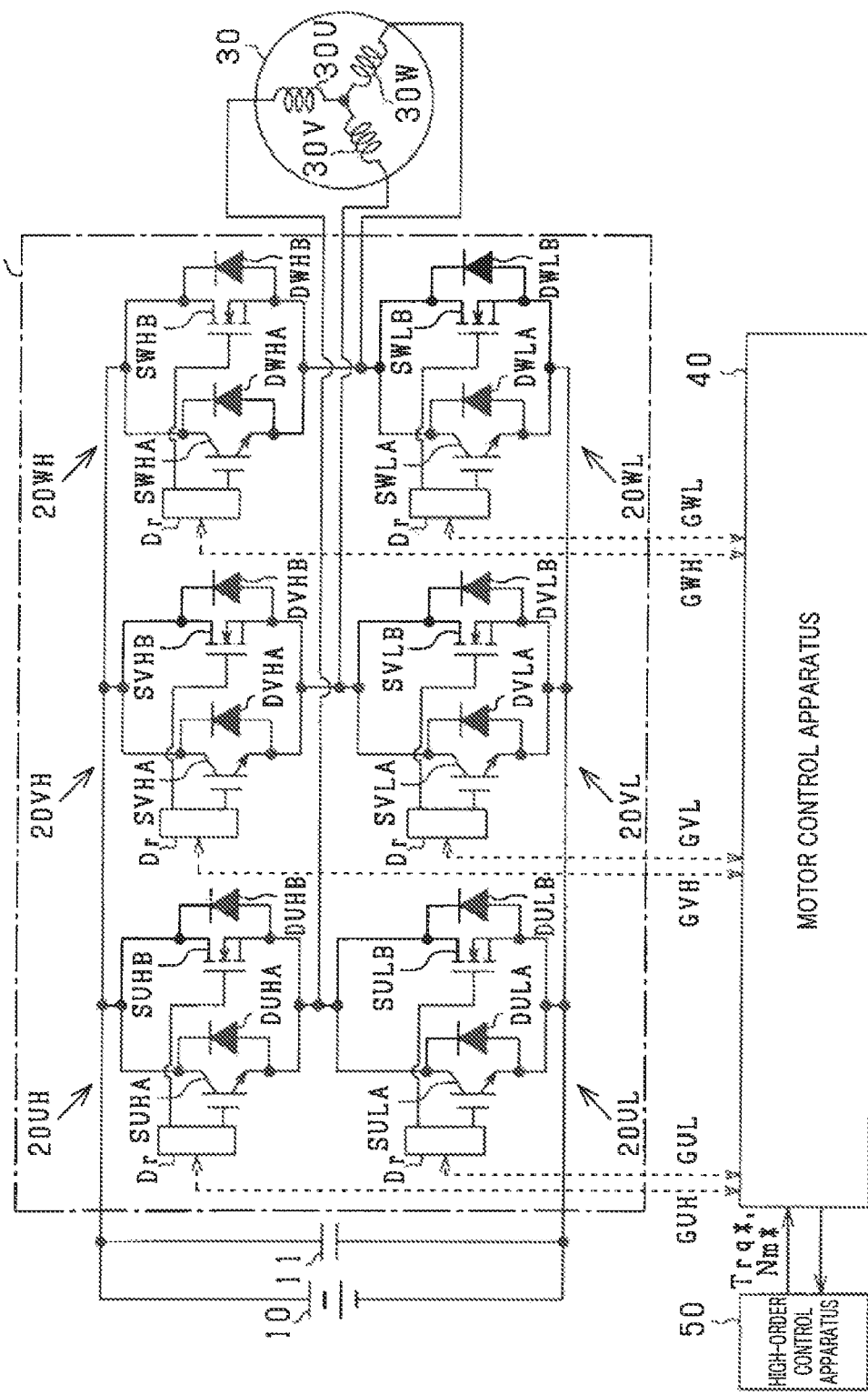
FIG. 1 is an overall configuration diagram of an onboard motor control system according to a first embodiment.

As shown in FIG. 1, the control system includes a battery 10, an inverter 20, a motor generator 30, a motor control apparatus 40, and a high-order control apparatus 50. The battery 10 serves as a direct-current power supply. The motor generator 30 serves as a rotating electric machine.

The motor generator 30 is an onboard main machine that is capable of performing power transmission with a drive wheel (not shown). The motor generator 30 is electrically connected to the battery 10, with the inverter 20 therebetween. According to the present embodiment, a three-phase permanent-magnet synchronous motor is used as the motor generator 30. In addition, for example, the battery 10 is a secondary battery that has an inter-terminal voltage of 100 volts or higher. For example, a lithium-ion storage battery or a nickel-hydrogen storage battery can be used as the battery 10. A capacitor 11 is connected in parallel to the battery 10.

The inverter 20 includes switch units. Specifically, the inverter 20 includes a series-connection body composed of a U-phase upper arm switch unit 20UH and a U-phase lower arm switch unit 20UL. The U-phase upper arm switch unit 20UH includes a parallel-connection body composed of a U-phase first upper arm switch SUHA and a U-phase second upper arm switch SUHB. The U-phase lower arm switch unit 20UL includes a parallel-connection body composed of a U-phase first lower arm switch SULA and a U-phase second lower arm switch SULB. Respective input terminals of the U-phase first lower arm switch SULA and the U-phase second lower arm switch SULB are connected to respective output terminals of the U-phase first upper arm switch SUHA and the U-phase second upper arm switch SUHB.

The inverter 20 includes a series-connection body composed of a V-phase upper arm switch unit 20VH and a V-phase lower arm switch unit 20VL. The V-phase upper arm switch unit 20VH includes a parallel-connection body composed of a V-phase first upper arm switch SVHA and a V-phase second upper arm switch SVHB. The V-phase lower arm switch unit 20VL includes a parallel-connection body composed of a V-phase first lower arm switch SVLA and a V-phase second lower arm switch SVLB.

The inverter 20 includes a series-connection body composed of a W-phase upper arm switch unit 20WH and a W-phase lower arm switch unit 20WL. The W-phase upper arm switch unit 20WH includes a parallel-connection body composed of a W-phase first upper arm switch SWHA and a W-phase second upper arm switch SWHB. The W-phase lower arm switch unit 20WL includes a parallel-connection body composed of a W-phase first lower arm switch SWLA and a V-phase second lower arm switch SVLB.

According to the present embodiment, a silicon (Si) IGBT is used as each of the first switches SUHA, SULA, SVHA, SVLA, SWHA, and SWLA. The Si-IGBT is an Si device. Therefore, in each of the first switches SUHA, SULA, SVHA, SVLA, SWHA, and SWLA, an output terminal is an emitter and an input terminal is a collector. In addition, according to the present embodiment, an N-channel MOSFET is used as each of the second switches SUHB, SULB, SVHB, SVLB, SWHB, and SWLB. The N-channel MOSFET is a silicon carbide (SiC) device. Therefore, in each of the second switches SUHB, SULB, SVHB, SVLB, SWHB, and SWLB, an output terminal is a source and an input terminal is a drain.

Freewheeling diodes DUHA, DULA, DVHA, DVLA, DWHA, and DWLA are respectively connected in inverse parallel to the first switches SUHA, SULA, SVHA, SVLA, SWHA, and SWLA. In addition, parasitic diodes DUHB, DULB, DVHB, DVLB, DWHB, and DWLB are respectively formed in the second switches SUHB, SULB, SVHB, SVLB, SWHB, and SWLB. Here, freewheeling diodes may be respectively connected in inverse parallel to the second switches SUHB, SULB, SVHB, SVLB, SWHB, and SWLB.

Figure 2:
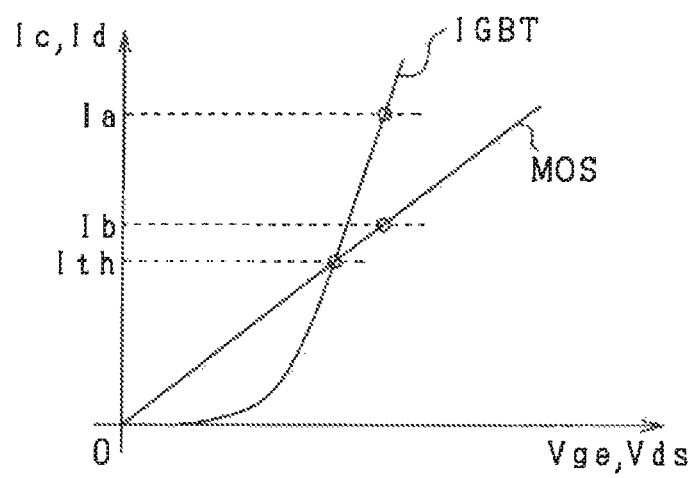
FIG. 2 is a diagram of current-voltage characteristics of an IGBT and a MOSFET.

According to the present embodiment, the switch units 20UH, 20UL, 20VH, 20VL, 20WH, and 20WL are each configured by the parallel-connection body composed of the IGBT and the MOSFET to reduce loss. A description will be given below with reference to FIG. 2. FIG. 2 shows voltage-current characteristics of a source-drain voltage Vds and a drain current Id of the MOSFET, and voltage-current characteristics of a collector-emitter voltage Vce and a collector current Ic of the IGBT.

As shown in FIG. 2, in a low-current region in which the current is lower than a threshold current Ith, the drain-source voltage Vds corresponding to the drain current Id is lower than the collector-emitter voltage Vce corresponding to the collector current Ic. That is, in the low-current region, an on-resistance of the MOSFET is lower than an on-resistance of the IGBT. Meanwhile, in a high-current region in which the current is higher than the threshold current Ith, the collector-emitter voltage Vce in relation to the collector current Ic is lower than the drain-source voltage Vds in relation to the drain current Id. That is, in the high-current region, the on-resistance of the IGBT is lower than the on-resistance of the MOSFET. Therefore, loss in the inverter 20 can be reduced as a result of the current being supplied to the MOSFET in the low-current region and the current being supplied to the IGBT in the high-current region.

In addition, according to the present embodiment, a first current capacity Ia is set to be greater than a second current capacity Ib. The first current capacity Ia is the current capacity of each of the first switches SUHA, SULA, SVHA, SVLA, SWHA, and SWLA. The second current capacity Ib is the current capacity of each of the second switches SUHB, SULB, SVHB, SVLB, SWHB, and SWLB. In addition, the second current capacity Ib is set to a value that is greater than the threshold current Ith. Here, according to the present embodiment, the threshold current Ith corresponds to a "first threshold" and a "second threshold." That is, according to the present embodiment, the first threshold and the second threshold are set to the same value.

Returning to the description of FIG. 1 given above, the motor generator 30 includes U-, V-, and W-phase windings 30U, 30V, and 30W. The U-, V-, and W-phase windings 30U, 30V, and 30W are inductive loads. A first end of the U-phase winding 30U of the motor generator 30 is connected to a connection point between the U-phase upper arm switch unit 20UH and the U-phase lower arm switch unit 20UL. Second ends of the phase windings 30U, 30V, and 30W are connected to a neutral point. A first end of the V-phase winding 30V of the motor generator 30 is connected to a connection point between the V-phase upper arm switch unit 20VH and the V-phase lower arm switch unit 20VL. A first end of the W-phase winding 30W of the motor generator 30 is connected to a connection point between the W-phase upper arm switch unit 20WH and the W-phase lower arm switch unit 20WL. Second ends of the phase windings 30U, 30V, and 30W are connected by a neutral point.

The motor control apparatus 40 is mainly configured by a microcomputer. The motor control apparatus 40 operates the switches SUHA to SWLB configuring the inverter 30 to control controlled variables of the motor generator 30 to command values. According to the present embodiment, the controlled variables are torque and rotation speed. The command values are a torque command value Trq* and a speed command value Nm*. The torque command value Trq* and the speed command value Nm* are inputted to the motor control apparatus 40 from the high-order control apparatus 50. The high-order control apparatus 50 is a control apparatus of a higher order than the motor control apparatus 40 and manages vehicle control.

Figure 3:
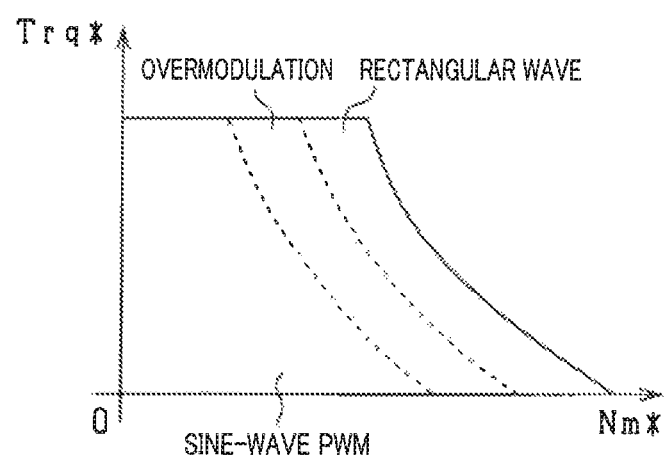
FIG. 3 is a diagram of a relationship between torque and rotation speed of a motor generator, and control states.

As shown in FIG. 3, the motor control apparatus 40 selects any type of control among sine-wave PWM control, overmodulation control, and rectangular wave control, based on the torque command value Trq* and the speed command value Nm*. The motor control apparatus 40 then performs the selected type of control.

The sine-wave PWM control is control performed to generate control signals GUH, GUL, GVH, GVL, GWH, and GWL based on a carrier signal, such as a triangular wave signal, and a comparison of the magnitudes of U-, V-, and W-phase command voltages Vu*, Vv*, and Vw*. The U-, V-, and W-phase command voltages Vu*, Vv*, and Vw* are respectively applied to the U-, V-, and W-phase windings 30U, 30V, and 30W. The control signals GUH, GUL, GVH, GVL, GWH, and GWL are PWM signals used for on/off operations of the switches configuring the switch units 20UH, 20UL, 20VH, 20VL, 20WH, and 20WL. The control signals GUH, GUL, GVH, GVL, GWH, and GWL are each composed of an on-command and an off-command. The on-command issues an instruction to perform an on-operation of a switch. The off-command issues an instruction to perform an off-operation of a switch. According to the present embodiment, the phase command voltages Vu*, Vv*, and Vw* are sine-wave signals of which the phases are shifted from each other by an electrical angle of 120 degrees. The amplitude of each of the phase command voltages Vu*, Vv*, and Vw* in the sine-wave PWM control is set to be equal to or lower than the amplitude of the carrier signal.

The overmodulation control is control performed to generate the control signals GUH, GUL, GVH, GVL, GWH, and GWL based on a comparison of magnitude between the carrier signal and the phase command voltages Vu*, Vv*, and Vw* that each have an amplitude greater than the amplitude of the carrier signal.

The rectangular wave control is control performed to generate the control signals GUH, GUL, GVH, GVL, GWH, and GWL such that, for each phase, a state in which the upper arm is turned on and the lower arm switch is turned off, and a state in which the upper arm switch is turned off and the lower arm switch is turned on are each implemented once during a single period of an electrical angle of the motor generator 30.

The motor control apparatus 40 outputs the generated control signals GUH, GUL, GVH, GVL, GWH, and GWL to a drive circuit Dr of the corresponding switch unit 20UH, 20UL, 20VH, 20VL, 20WH, or 20WL. Here, the control signals GUH, GVH, and GWH of the upper arm side and the corresponding control signals GUL, GVL, and GWL of the lower arm side are mutually complementary signals. That is, for each phase, the upper arm switch and the corresponding lower arm switch are alternately turned on.

Next, a configuration of the drive circuit Dr will be described with reference to FIG. 4. The drive circuits Dr corresponding to the switch units 20UH, 20UL, 20VH, 20VL, 20WH, and 20WL according to the present embodiment basically have the same configuration. Therefore, an example of the drive circuit Dr corresponding to the U-phase upper arm switch unit 20UH will be described hereafter.

Figure 4:
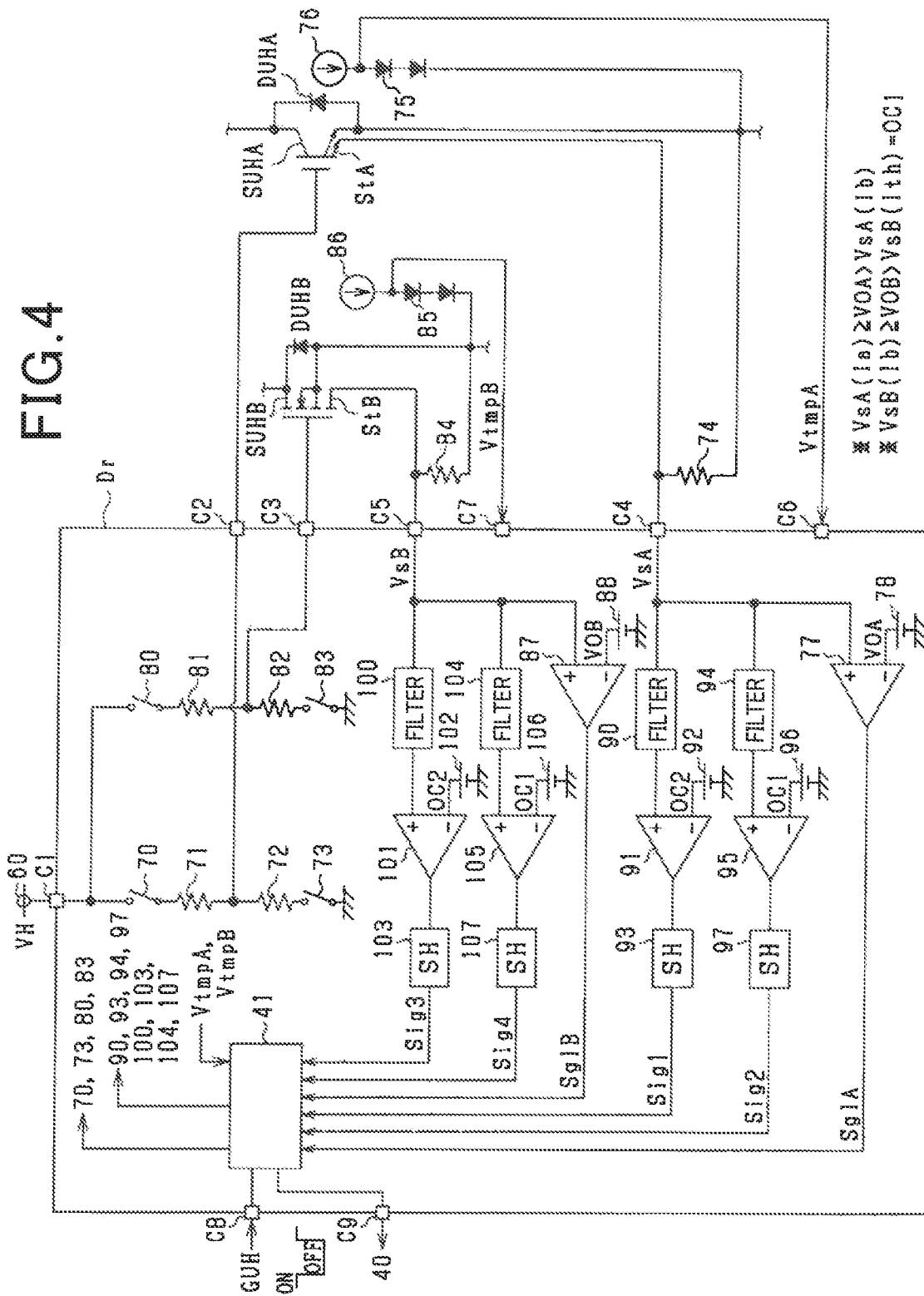
FIG. 4 is a diagram of a configuration of a drive circuit and peripherals attached thereto.

The drive circuit Dr shown in FIG. 4 is composed of an integrated circuit. The drive circuit Dr is supplied power from a constant-voltage power supply 60. According to the present embodiment, an output voltage of the constant-voltage power supply 60 is denoted by VH. For example, the constant-voltage power supply 60 is an isolated power supply that includes a transformer or the like.

According to the present embodiment, the drive circuit Dr is configured such as to be capable of independently driving the U-phase first upper arm switch SUHA and the U-phase second upper arm switch SUHB. First, a configuration for driving the U-phase first upper arm switch SUHA will be described. The drive circuit Dr includes a first charge switch 70, a first charge resistor 71, a first discharge resistor 72, and a first discharge switch 73. A first terminal C1 of the drive circuit Dr is connected to a first end of the first charge switch 70. The constant-voltage power supply 60 is connected to the first terminal C1. A first end of the first charge resistor 71 is connected to a second end of the first charge switch 70. A second terminal C2 of the drive circuit Dr is connected to a second end of the first charge resistor 71. A gate that is an open/close control terminal of the U-phase first upper arm switch SUHA is connected to the second terminal C2. A first end of the first discharge resistor 72 is connected to the second terminal C2. The emitter of the U-phase first upper arm switch SUHA is connected to a second end of the first discharge resistor 72, with the first discharge switch 73 therebetween.

Next, a configuration for driving the U-phase second upper arm switch SUHB will be described. The drive circuit Dr includes a second charge switch 80, a second charge resistor 81, a second discharge resistor 82, and a second discharge switch 83. The first terminal C1 is connected to a first end of the second charge switch 80. A first end of the second charge resistor 81 is connected to a second end of the second charge switch 80. A third terminal C3 of the drive circuit Dr is connected to a second end of the second charge resistor 81. A gate of the U-phase second upper arm switch SUHB is connected to the third terminal C3. A first end of the second discharge resistor 82 is connected to the third terminal C3. A source of the U-phase second upper arm switch SUHB is connected to a second end of the discharge resistor 82, with the second discharge switch 83 therebetween.

The U-phase first upper arm switch SUHA includes a first sense terminal StA that outputs a miniscule current that is correlated with the collector current Ic. A first end of a first sense resistor 74 is connected to the first sense terminal StA. The emitter of the U-phase first upper arm switch SUHA is connected to a second end of the first sense resistor 74. As a result, voltage drop occurs in the first sense resistor 74 as a result of the miniscule current outputted from the first sense terminal StA. According to the present embodiment, electric potential on the first end side of the first sense resistor 74 in relation to emitter potential is referred to as a first sense voltage VsA. A fourth terminal C4 of the drive circuit Dr is connected to the first end of the first sense resistor 74. According to the present embodiment, with zero as the emitter potential, the first sense voltage VsA when the electric potential on the first end side of the first sense resistor 74 is higher than the emitter potential is defined as being positive. In addition, according to the present embodiment, the first sense voltage VsA corresponds to a "first current detection value."

The U-phase second upper arm switch SUHB includes a second sense terminal StB that outputs a miniscule current that is correlated with the drain current Id. A first end of a second sense resistor 84 is connected to the second sense terminal StB. The source of the U-phase second upper arm switch SUHB is connected to a second end of the second sense resistor 84. As a result, voltage drop occurs in the second sense resistor 84 as a result of the miniscule current outputted from the second sense terminal StB. According to the present embodiment, electric potential on the first end side of the second sense resistor 84 in relation to source potential is referred to as a second sense voltage VsB. A fifth terminal C5 of the drive circuit Dr is connected to the first end of the second sense resistor 84. According to the present embodiment, with zero as the source potential, the second sense voltage VsB when the electric potential on the first end side of the second sense resistor 84 is higher than the source potential is defined as being positive. In addition, according to the present embodiment, the second sense voltage VsB corresponds to a "second current detection value."

According to the present embodiment, when the collector current flowing to the U-phase first upper arm switch SUHA and the drain current flowing to the U-phase second upper arm switch SUHB are equal, the first sense voltage VsA and the second sense voltage VsB are equal. For example, this can be implemented through use of a configuration in which an output current of the first sense terminal StA and an output current of the second sense terminal StB are equal when a resistance value of the first sense resistor 74 and a resistance value of the second sense resistor 84 are set to the same value, and the collector current and the drain current are equal.

A first temperature-sensitive diode 75 is provided near the U-phase first upper arm switch SUHA. The first temperature-sensitive diode 75 detects a temperature of the U-phase first upper arm switch SUHA. The emitter of the U-phase first upper arm switch SUHA is connected to a cathode of the first temperature-sensitive diode 75. A first constant-current power supply 76 is connected to an anode of the first temperature-sensitive diode 75. As a result, the first temperature-sensitive diode 75 outputs a first temperature signal VtmpA that is a signal based on the temperature of the U-phase first upper arm switch SUHA. The first temperature signal VtmpA is inputted to a drive control unit 41 included in the drive circuit Dr, via a sixth terminal C6 of the drive circuit Dr connected to the anode of the first temperature-sensitive diode 75. Here, the temperature of the U-phase first upper arm switch SUHA and the first temperature signal VtmpA have a negative correlation.

A second temperature-sensitive diode 85 is provided near the U-phase second upper arm switch SUHB. The second temperature-sensitive diode 85 detects a temperature of the U-phase second upper arm switch SUHB. The source of the U-phase second upper arm switch SUHB is connected to a cathode of the second temperature-sensitive diode 85. A second constant-current power supply 86 is connected to an anode of the second temperature-sensitive diode 85. As a result, the second temperature-sensitive diode 85 outputs a second temperature signal VtmpB that is a signal based on the temperature of the U-phase second upper arm switch SUHB. The second temperature signal VtmpB is inputted to the drive control unit 41 via a seventh terminal C7 of the drive circuit Dr. Here, the temperature of the U-phase second upper arm switch SUHB and the second temperature signal VtmpB have a negative correlation.

The drive circuit Dr includes a configuration for detecting an overcurrent that flows to the U-phase first upper arm switch SUHA. Specifically, the drive circuit Dr includes a first current comparator 77 and a first current power supply 78. The first current power supply 78 serves as a constant-voltage power supply. The fourth terminal C4 is connected to a non-inverting input terminal of the first current comparator 77. A positive terminal of the first current power supply 78 is connected to an inverting input terminal of the first current comparator 77. The emitter of the U-phase first upper arm switch SUHA is connected to a negative terminal of the first current power supply 78. A filter (not shown) is provided between the non-inverting input terminal of the first current comparator 77 and the fourth terminal C4.

A first overcurrent threshold VOA is an output voltage of the first current power supply 78. The first overcurrent threshold VOA is set to a value that enables detection of the overcurrent flowing to the U-phase first upper arm switch SUHA. According to the present embodiment, the first overcurrent threshold VOA is set to a value that is equal to or less than the first sense voltage VsA when a current that is the same as the first current capacity Ia flows to the U-phase first upper arm switch SUHA, and greater than the first sense voltage VsA when a current that is the same as the second current capacity Ib flows to the U-phase first upper arm switch SUHA.

When the first sense voltage VsA exceeds the first overcurrent threshold VOA, the logic level of a first overcurrent signal SgIA is inverted from L to H. The first overcurrent signal SgIA is the output signal of the first current comparator 77 and is inputted to the drive control unit 41.

The drive circuit Dr includes a configuration for detecting an overcurrent that flows to the U-phase second upper arm switch SUHB. Specifically, the drive circuit Dr includes a second current comparator 87 and a second current power supply 88. The first current power supply 88 serves as a constant-voltage power supply. The fifth terminal C5 is connected to a non-inverting input terminal of the second current comparator 87. A positive terminal of the second current power supply 88 is connected to an inverting input terminal of the second current comparator 87. The source of the U-phase second upper arm switch SUHB is connected to a negative terminal of the second current power supply 88. A filter (not shown) is provided between the non-inverting input terminal of the second current comparator 87 and the fifth terminal C5.

A second overcurrent threshold VOB is an output voltage of the second current power supply 88. The second overcurrent threshold VOB is set to a value that enables detection of the overcurrent flowing to the U-phase second upper arm switch SUHB. According to the present embodiment, the second overcurrent threshold VOB is set to a value that is equal to or less than the second sense voltage VsB when a current that is the same as the second current capacity Ib flows to the U-phase second upper arm switch SUHB, and greater than the second sense voltage VsB when a current that is the same as the threshold current Ith flows to the U-phase second upper arm switch SUHB.

When the second sense voltage VsB exceeds the second overcurrent threshold VOB, the logic level of a second overcurrent signal SgIB is inverted from L to H. The second overcurrent signal SgIB is the output signal of the second current comparator 87 and is inputted to the drive control unit 41.

The control signal GUH is inputted to the drive control unit 41 from the motor control apparatus 40, via an eighth terminal C8 of the drive circuit Dr. According to the present embodiment, the drive control unit 41 corresponds to an "operating unit," a "current acquiring unit," and a "temperature acquiring unit." The drive control unit 41 selects either of the U-phase first upper arm switch SUHA and the U-phase second upper arm switch SUHB, and drives the selected switch.

First, a case in which the U-phase first upper arm switch SUHA is selected to be driven will be described. When determined that the control signal GUH is the on-command, the drive control unit 41 performs a process to turn on the first charge switch 70 and turn off the first discharge switch 73, as a charge process. As a result, the U-phase first upper arm switch SUHA is switched from an off-state to an on-state. Meanwhile, when determined that the control signal GUH is the off-command, the drive control unit 41 performs a process to turn off the first charge switch 70 and turn on the first discharge switch 73, as a discharge process. As a result, the U-phase first upper arm switch SUHA is switched from the on-state to the off-state.

Next, a case in which the U-phase second upper arm switch SUHB is selected to be driven will be described. When determined that the control signal GUH is the on-command, the drive control unit 41 performs a process to turn on the second charge switch 80 and turn off the second discharge switch 83, as a charge process. As a result, the U-phase second upper arm switch SUHB is switched from the off-state to the on-state. Meanwhile, when determined that the control signal GUH is the off-command, the drive control unit 41 performs a process to turn off the second charge switch 80 and turn on the second discharge switch 83, as a discharge process. As a result, the U-phase second upper arm switch SUHB is switched from the on-state to the off-state.

Figure 5:
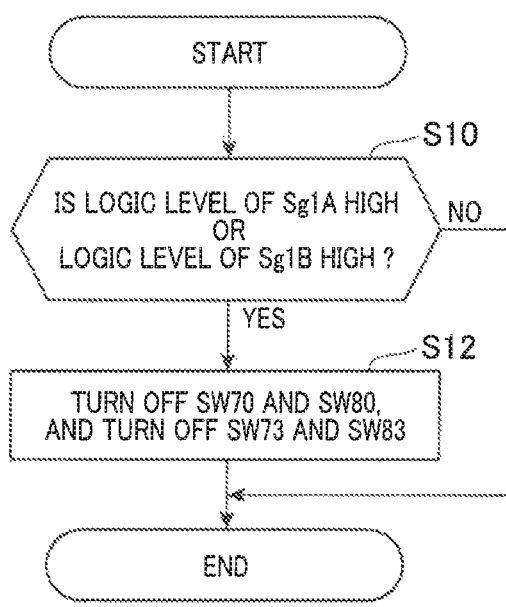
FIG. 5 is a flowchart of the steps in an overcurrent detection process.

FIG. 5 shows the steps in an overcurrent detection process performed by the drive control unit 41. The process is repeatedly performed by the drive control unit 41 at, for example, a predetermined period.

In this series of processes, first, at step S10, the drive control unit 41 determines whether or not a logical sum of following first and second conditions is true: the first condition that the logic level of the first overcurrent signal SgIA is H, i.e., SgIA=H is true, and the second condition that the logic level of the second overcurrent signal SgIB is H, i.e., SgIB=H is true.

When determined at step S10 that the logic level of the first overcurrent signal SgIA is H, i.e., SgIA=H is true, the drive control unit 41 determines that an overcurrent is flowing to the U-phase first upper arm switch SUHA and proceeds to step S12. In addition, when determined at step S10 that the logic level of the second overcurrent signal SgIB is H, i.e., SgIB=H is true, the drive control unit 41 determines that an overcurrent is flowing to the U-phase second upper arm switch SUHB and proceeds to step S12. At step S12, the drive control unit 41 forcibly turns off the first charge switch 70 and the second charge switch 80 and forcibly turns on the first discharge switch 73 and the second discharge switch 83, regardless of instructions based on the control signal GUH. As a result, the switch to which the overcurrent is determined to be flowing is forcibly switched to the off-state.

In addition to the process at step S12, a process may be performed to transmit, to the motor control apparatus 41 via a ninth terminal C9 of the drive circuit Dr, information indicating that an overcurrent has flowed to the switch.

Returning to the description of FIG. 4 given above, the drive circuit Dr includes a configuration for determining which of the U-phase first upper arm switch SUHA and the U-phase second upper arm switch SUHB is to be subjected to the on-operation target. Specifically, the drive circuit Dr includes a first filter 90, a first comparator 91, a first power supply 92, a first sample-and-hold circuit 93, a second filter 94, a second comparator 95, a second power supply 96, and a second sample-and-hold circuit 97.

The fourth terminal C4 is connected to the input sides of the first filter 90 and the second filter 94. A non-inverting input terminal of the first comparator 91 is connected to the output side of the first filter 90. A positive terminal of the first power supply 92 is connected to an inverting input terminal of the first comparator 91. The emitter of the U-phase first upper arm switch SUHA is connected to a negative terminal of the first power supply 92. The first sample-and-hold circuit 93 is connected to an output terminal of the first comparator 91. A first determination signal Sig1 that is an output signal of the first sample-and-hold circuit 93 is inputted to the drive control unit 41.

A non-inverting input terminal of the second comparator 95 is connected to the output side of the second filter 94. A positive terminal of the second power supply 96 is connected to an inverting input terminal of the second comparator 95. The emitter of the U-phase first upper arm switch SUHA is connected to a negative terminal of the second power supply 96. The second sample-and-hold circuit 97 is connected to an output terminal of the second comparator 95. A second determination signal Sig2 that is an output signal of the second sample-and-hold circuit 97 is inputted to the drive control unit 41.

The drive circuit Dr includes a third filter 100, a third comparator 101, a third power supply 102, a third sample-and-hold circuit 103, a fourth filter 104, a fourth comparator 105, a fourth power supply 106, and a fourth sample-and-hold circuit 107. The fifth terminal C5 is connected to the input sides of the third filter 100 and the fourth filter 104. A non-inverting input terminal of the third comparator 101 is connected to the output side of the third filter 100. A positive terminal of the third power supply 102 is connected to an inverting input terminal of the third comparator 101. The source of the U-phase second upper arm switch SUHB is connected to a negative terminal of the third power supply 102. The third sample-and-hold circuit 103 is connected to an output terminal of the third comparator 101. A third determination signal Sig3 that is an output signal of the third sample-and-hold circuit 103 is inputted to the drive control unit 41.

A non-inverting input terminal of the fourth comparator 105 is connected to the output side of the fourth filter 104. A positive terminal of the fourth power supply 106 is connected to an inverting input terminal of the fourth comparator 105. The source of the U-phase second upper arm switch SUHB is connected to a negative terminal of the fourth power supply 106. The fourth sample-and-hold circuit 107 is connected to an output terminal of the fourth comparator 105. A fourth determination signal Sig4 that is an output signal of the fourth sample-and-hold circuit 107 is inputted to the drive control unit 41.

Figure 6:
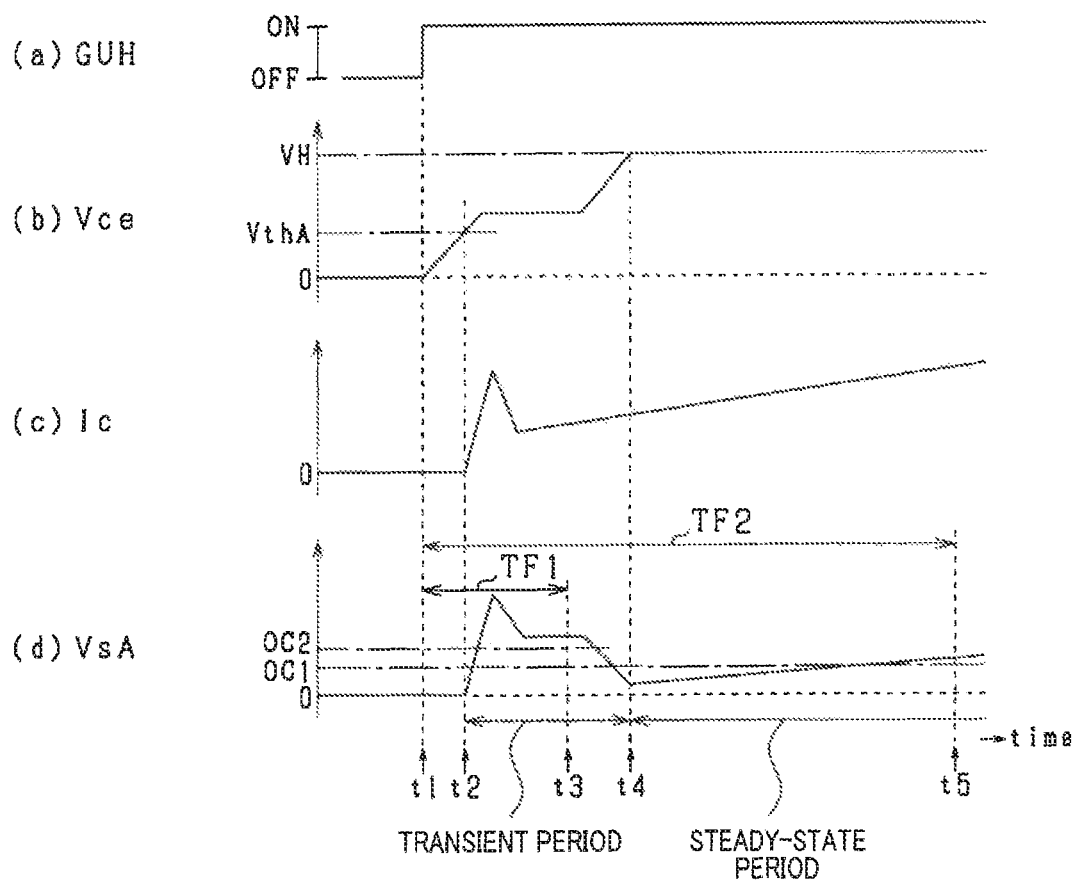
FIG. 6 is a time chart of transitions in waveforms when the IGBT is driven.

When the U-phase first upper arm switch SUHA is selected as the on-operation target based on a current on-command by the control signal GUH, the drive control unit 41 instructs the first filter 90, the first sample-and-hold circuit 93, the second filter 94, and the second sample-and-hold circuit 97 to perform a predetermined process. The predetermined process will be described with reference to FIG. 6. Here, FIG. 6 shows: (a) a transition of the control signal GUH; (b) a transition of the collector-emitter voltage Vce; (c) a transition of the collector current Ic; and (d) a transition of the first sense voltage VsA.

As shown in FIG. 6, the control signal GUH is switched to an on-command at time t1. Charging of the gate of the U-phase first arm switch SUHA is started. As a result, the collector-emitter voltage Vce starts to rise.

Subsequently, at time t2, the collector-emitter voltage Vce reaches a first threshold voltage VthA. As a result, the U-phase first upper arm switch SUHA is switched from the off-state to the on-state. The collector current Ic starts to rise. Then, in accompaniment with the rise in the collector current Ic, the first sense voltage VsA also starts to rise. Subsequently, the collector-emitter voltage Vce passes through a period of a Miller plateau voltage. At time t4, the collector-emitter voltage Vce reaches an output voltage VH of the constant-voltage power supply 60 that serves as an upper-limit voltage.

Here, the time from time t1 to time t3 that is before time 4 is defined as a first filter time TF1. The period from time t2 to time t4 is defined as a transient period. In addition, the time from time t1 to time t5 that is after time t4 is defined as a second filter time TF2. The period from time t4 to the timing at which the on-command switches to the off-command is defined as a steady-state period.

The drive control unit 41 instructs the first filter 90 to perform a process to invalidate the first sense voltage VsA from time t1 until the elapse of the first filter time TF1. As a result, from time t1 until the elapse of the first filter time TF1, an output signal of the first filter 90 does not exceed a transient threshold OC2 that is an output voltage of the first power supply 92. Therefore, the logic level of an output signal of the first comparator 91 is held at L. Then, the drive control unit 41 instructs the first sample-and-hold circuit 93 to hold the output signal of the first comparator 91 outputted at the timing of the elapse of the first filter time TF1. In addition, the drive control unit 41 instructs the second filter 94 to perform a process to invalidate the first sense voltage VsA from time t1 until the elapse of the second filter time TF2. Then, the drive control unit 41 instructs the second sample-and-hold circuit 97 to hold an output signal of the second comparator 95 outputted at the timing of elapse of the second filter time TF2.

Figure 7:
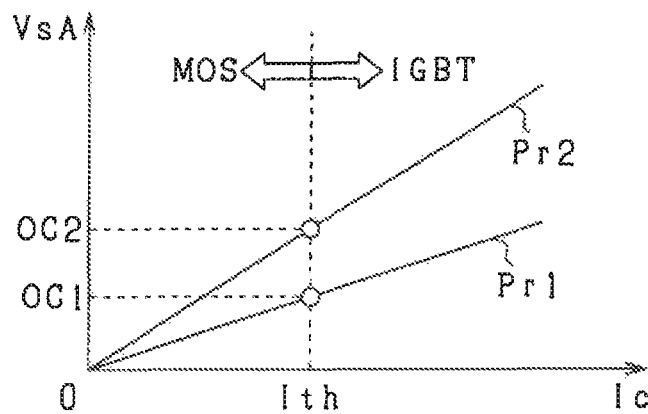
FIG. 7 is a diagram of transient characteristics and static characteristics of a sense voltage.

When the first sense voltage VsA becomes equal to or lower than a steady-state threshold OC1 at time t5, the logic level of the second determination signal Sig2 outputted from the second sample-and-hold circuit 97 becomes L. The steady-state threshold OC1 is an output voltage of the second power supply 96. Meanwhile, when the first sense voltage VsA exceeds the steady-state threshold OC1 at time t5, the logic level of the second determination signal Sig2 becomes H. According to the present embodiment, as shown in FIG. 7, the steady-state threshold OC1 is set to the first sense voltage VsA when the collector current Ic flowing to the U-phase first upper arm switch SUHA becomes the same current as the threshold current Ith.

Meanwhile, when the first sense voltage VsA becomes equal to or lower than the transient threshold OC2 at time t3, the logic level of the first determination signal Sig1 outputted from the first sample-and-hold circuit 93 becomes L. Meanwhile, when the first sense voltage VsA exceeds the transient threshold OC2 at time t3, the logic level of the first determination signal Sig1 becomes H. According to the present embodiment, as shown in FIG. 7, the transient threshold OC2 is set to a value that is greater than the steady-state threshold OC1. The transient threshold OC1 is set in this manner because transient characteristics Pr2 that indicate the relationship between the collector current Ic and the first sense voltage VsA during the transient period deviate from steady-state characteristics Pr1 that indicate the relationship between the collector current Ic and the first sense voltage VsA during the steady-state period. For example, the transient threshold OC2 may be set to a value that is less than the second overcurrent threshold VOB.

When determined that the logic levels of both the first determination signal Sig1 and the second determination signal Sig2 are H when the on-operation of the U-phase first upper arm switch SUHA is being performed based on the current on-command, the drive control unit 41 maintains the U-phase first upper arm switch SUHA as the on-operation target that is performed next time the on-command is received. Meanwhile, when determined that the logic level of at least either of the first determination signal Sig1 and the second determination signal Sig2 is L when the on-operation of the U-phase first upper arm switch SUHA is being performed based on the current on-command, the drive control unit 41 switches the on-operation target that is used the next time the on-command is received from the U-phase first upper arm switch SUHA to the U-phase second upper arm switch SUHB. Here, switching is determined through use of the two determination signals Sig1 and Sig2 to prevent erroneous determination regarding switching that results from noise mixing with the first sense voltage VsA and the like.

Figure 8:
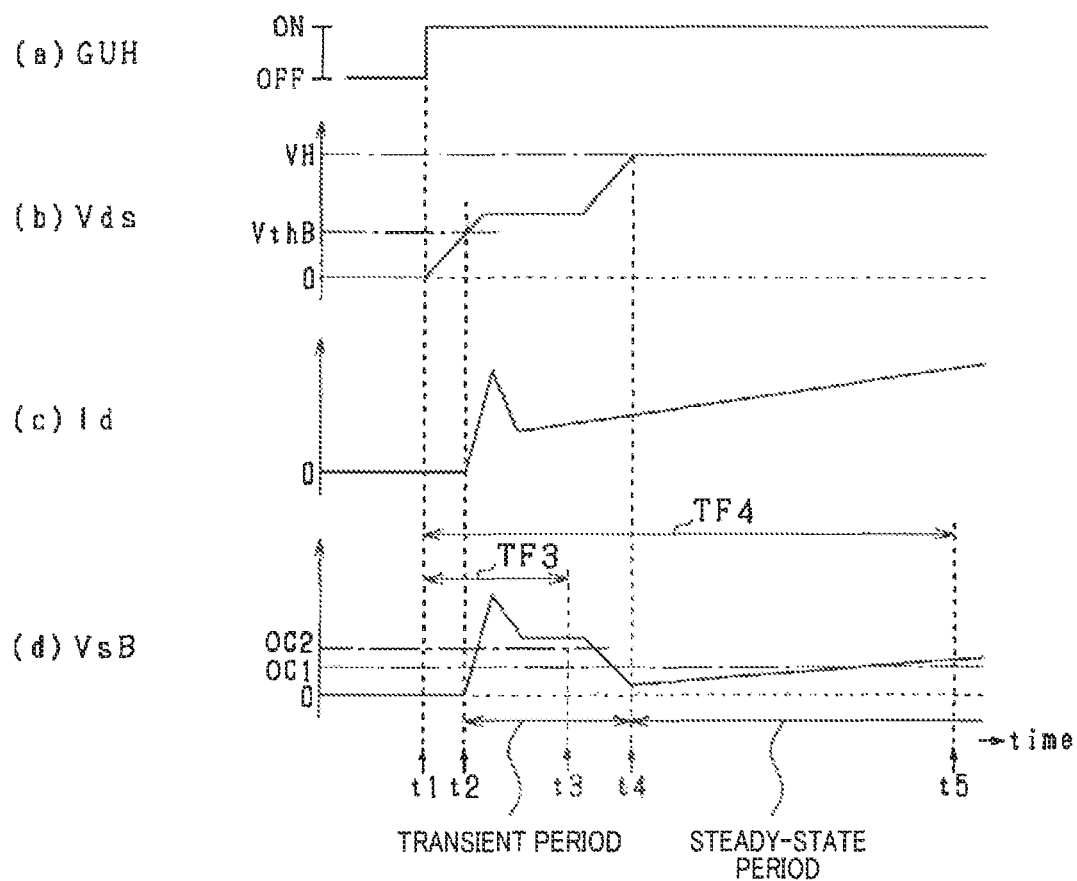
FIG. 8 is a time chart of transitions in waveforms when the MOSFET is driven.

When the U-phase second upper arm switch SUHB is selected as the on-operation target based on the current on-command, the drive control unit 41 instructs the third filter 100, the third sample-and-hold circuit 103, the fourth filter 104, and the fourth sample-and-hold circuit 107 to perform a predetermined process. The predetermined process will be described with reference to FIG. 8. Here, FIG. 8 shows: (a) a transition of the control signal GUH; (b) a transition of the drain-source voltage Vds; (c) a transition of the drain current Id; and (d) a transition of the second sense voltage VsB.

As shown in FIG. 8, the control signal GUH is switched to an on-command at time t1. Charging of the gate of the U-phase second arm switch SUHB is started. As a result, the drain-source voltage Vds starts to rise.

Subsequently, at time t2, the drain-source voltage Vds reaches a second threshold voltage VthB. As a result, the U-phase second upper arm switch SUHB is switched from the off-state to the on-state. The drain current Id starts to rise. Then, in accompaniment with the rise in the drain current Id, the second sense voltage VsB also starts to rise. Subsequently, the drain-source voltage Vds passes through a period of a Miller plateau voltage. At time t4, the drain-source voltage Vds reaches the output voltage VH of the constant-voltage power 6 supply 60.

Here, the time from time t1 to time t3 that is before time 4 is defined as a third filter time TF3. The period from time t2 to time t4 is defined as a transient period. In addition, the time from time t11 to time t5 that is after time t4 is defined as a fourth filter time TF4. The period from time t4 to the timing at which the on-command switches to the off-command is defined as a steady-state period.

The drive control unit 41 instructs the third filter 100 to perform a process to invalidate the second sense voltage VsB from time t1 until the elapse of the third filter time TF3. Then, the drive control unit 41 instructs the third sample-and-hold circuit 103 to hold an output signal of the third comparator 101 outputted at the timing of the elapse of the third filter time TF3. In addition, the drive control unit 41 instructs the fourth filter 104 to perform a process to invalidate the second sense voltage VsB from time t1 until the elapse of the fourth filter time TF4. Then, the drive control unit 41 instructs the fourth sample-and-hold circuit 107 to hold an output signal of the fourth comparator 105 outputted at the timing of elapse of the fourth filter time TF4.

When the second sense voltage VsB becomes equal to or lower than the above-described steady-state threshold OC1 at time t5, the logic level of the fourth determination signal Sig4 outputted from the fourth sample-and-hold circuit 107 becomes L. Meanwhile, when the second sense voltage VsB exceeds the steady-state threshold OC1 at time t5, the logic level of the fourth determination signal Sig4 becomes H.

When the second sense voltage VsB becomes equal to or lower than the above-described transient threshold OC2 at time t3, the logic level of the third determination signal Sig3 outputted from the third sample-and-hold circuit 103 becomes L. The transient threshold OC2 is the output voltage of the third power supply 102. Meanwhile, when the second sense voltage VsB exceeds the transient threshold OC2 at time t3, the logic level of the third determination signal Sig3 becomes H.

When determined that the logic levels of both the third determination signal Sig3 and the fourth determination signal Sig4 are H when the on-operation of the U-phase second upper arm switch SUHB is being performed based on the current on-command, the drive control unit 41 switches the on-operation target that is used the next time the on-command is received from the U-phase second upper arm switch SUHB to the U-phase first upper arm switch SUHA. Meanwhile, when determined that the logic level of at least either of the third determination signal Sig3 and the fourth determination signal Sig4 is L when the on-operation of the U-phase second upper arm switch SUHB is being performed based on the current on-command, the drive control unit 41 maintains the U-phase second upper arm switch SUHB as the on-operation target that is used the next time the on-command is received.

Figure 9:
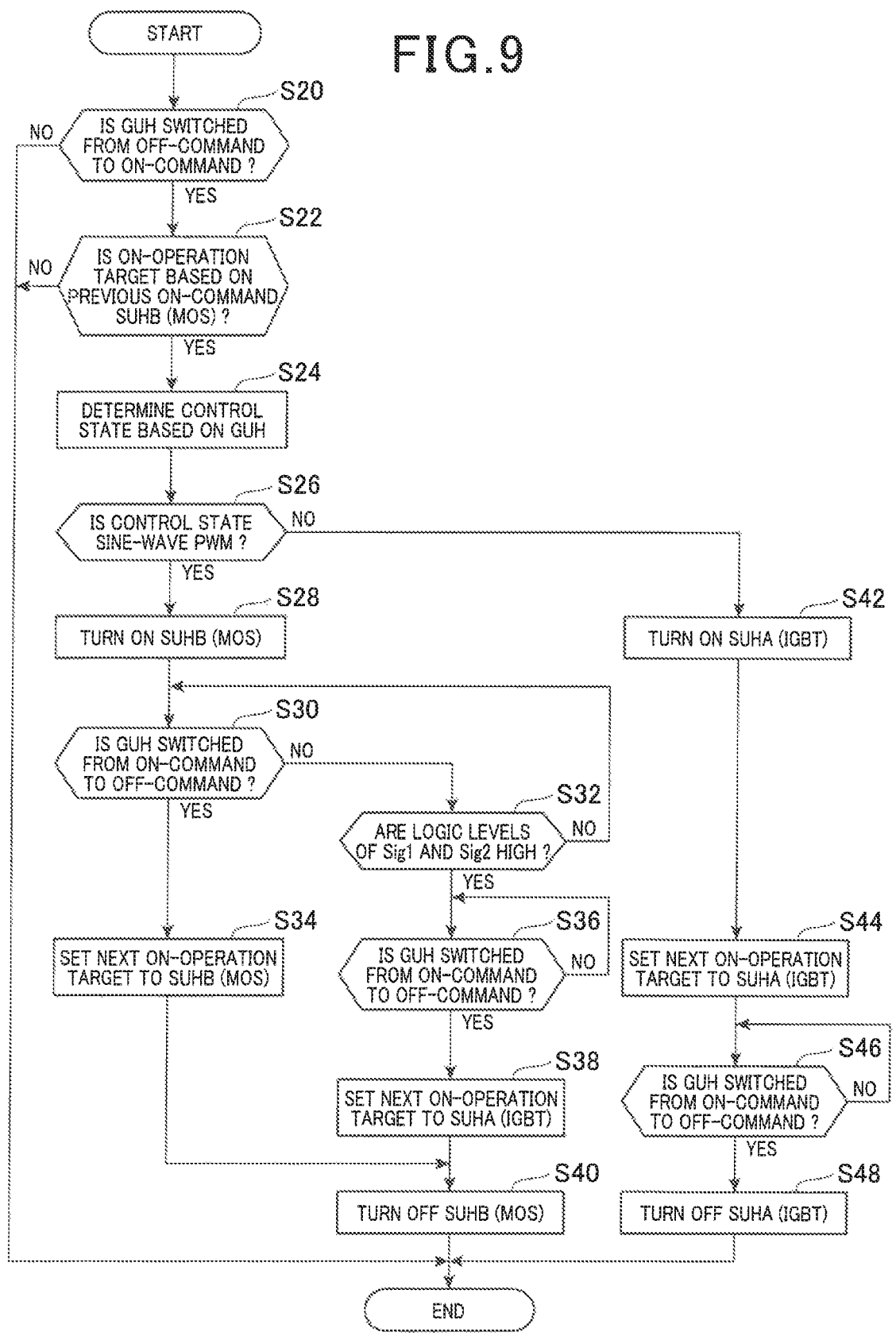
FIG. 9 is a flowchart of the steps in a switching process.
Figure 12:
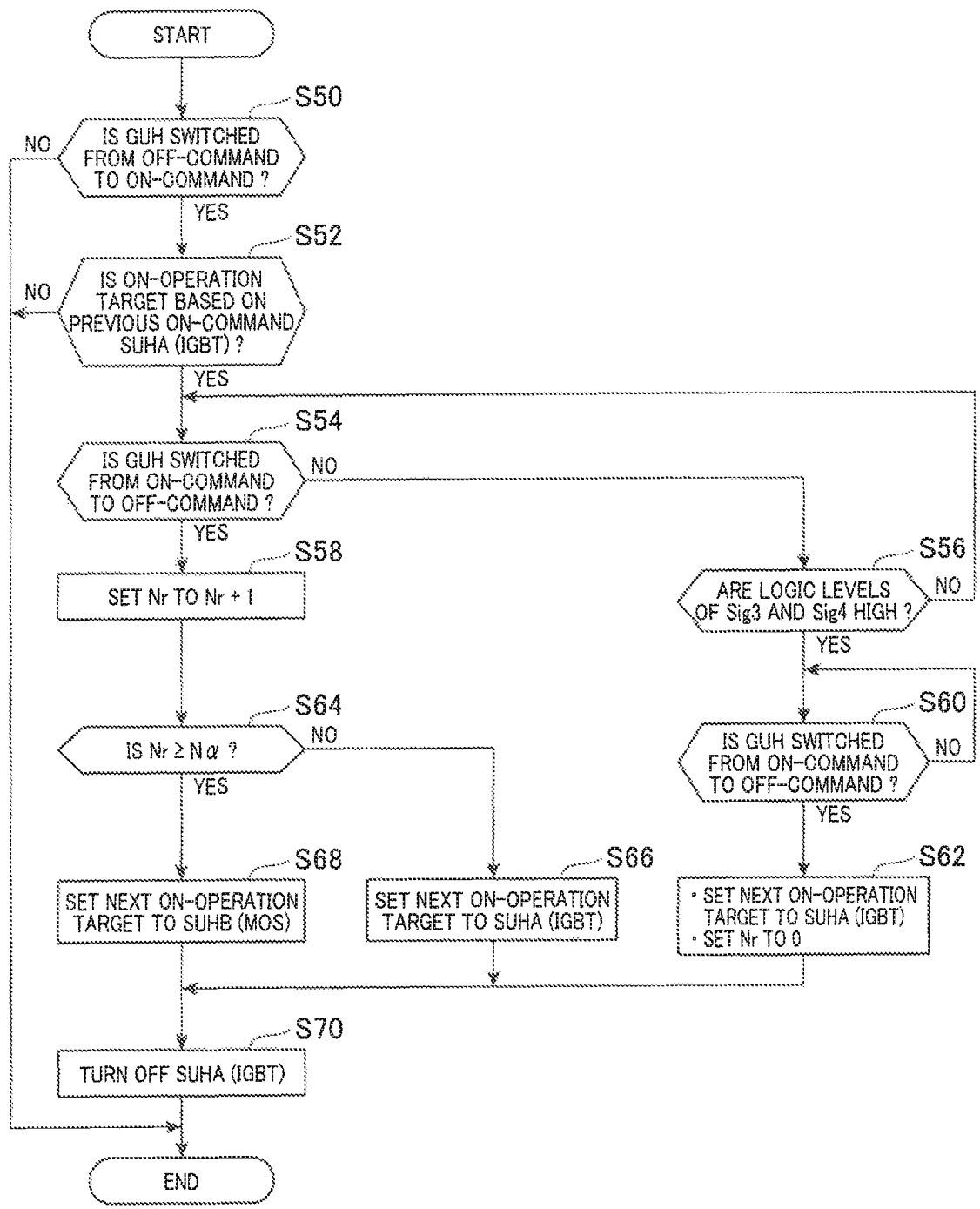
FIG. 12 is a flowchart of the steps in the switching process.

FIGS. 9 and 12 show the steps of a process for switching the on-operation target. Here, FIG. 9 corresponds to a case in which the U-phase second upper arm switch SUHB (MOSFET) is the switch that has been previously selected as the on-operation target. FIG. 12 corresponds to a case in which the U-phase first upper arm switch SUHA (IGBT) is the switch that has been previously selected as the on-operation target. The switching process is repeatedly performed by the drive control unit 41 at, for example, a predetermined period.

First, FIG. 9 will be described. In the series of processes shown in FIG. 9, first, at step S20, the drive control unit 41 determines whether or not the control signal GUH inputted via the eighth terminal C8 has been switched from the OFF-command to the on-command.

When determined at step S20 that the control signal GUH has been switched from the off-command to the on-command, the drive control unit 41 proceeds to step S22. The drive control unit 41 determines whether or not the on-operation target selected when the on-command had been previously inputted is the U-phase second upper arm switch SUHB.

Figure 10:
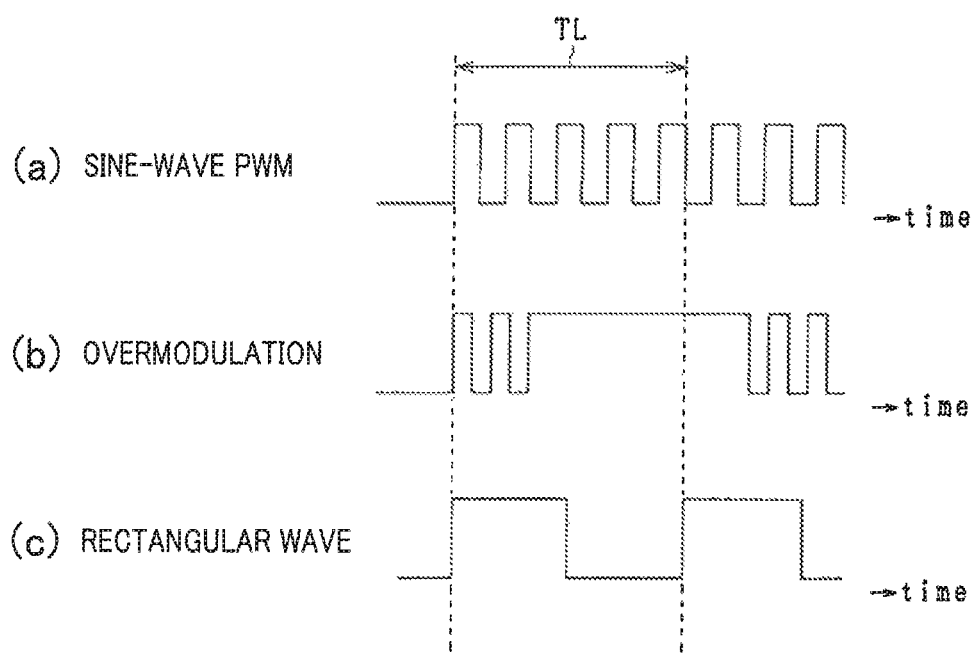
FIG. 10 is a diagram of an example of an control signal in sine-wave PWM control, overmodulation control, and rectangular wave control.
Figure 11:
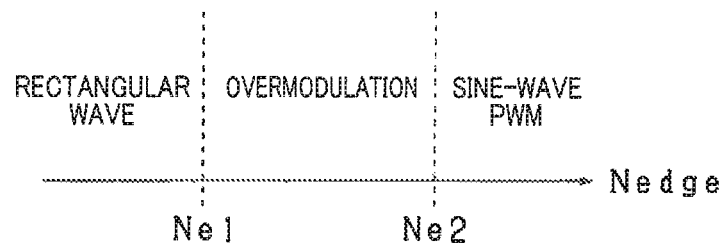
FIG. 11 is a diagram of a method for determining a control state.

When determined at step S22 that the on-operation target is the U-phase second upper arm switch SUHB, the drive control unit 41 proceeds to step S24. At step S24, the drive control unit 41 determines whether the currently selected control is the sine-wave PWM control, the overmodulation control, or the rectangular wave control based on the control signal GUH. According to the present embodiment, as shown in FIG. 10 by (a) to (c) and FIG. 11, the currently selected control is determined based on the total number of rising edges, the total number of falling edges, or the total number of rising and falling edges of the control signal during a prescribed amount of time TL. Specifically, when determined that a total number Nedge of the edges during a period from the current timing to the prescribed amount of time TL prior is equal to or less than a first predetermined value Ne1, the drive control unit 41 determines that the currently selected control is the rectangular wave control. Meanwhile, when determined that the total number Nedge of the edges is greater than the first predetermined value Ne1 and equal to or less than a second predetermined value Ne2, the drive control unit 41 determines that the currently selected control is the overmodulation control. Moreover, when determined that the total number Nedge of the edges is greater than the second predetermined value Ne2, the drive control unit 41 determines that the currently selected control is the sine-wave PWM control. FIG. 10 shows an example in which a single period of an electrical angle of the motor generator 30 is set as the prescribed amount of time TL.

Returning to the description of FIG. 9 given above, at subsequent S26, the drive control unit 41 determines whether or not the control determined at step S24 is the sine-wave PWM control.

When determined YES at step S26, the drive control unit 41 proceeds to step S28. The drive control unit 41 switches the U-phase second upper arm switch SUHB to the on-state by the charge process.

At subsequent steps S30 and S32, the drive control unit 41 determines whether or not the logic levels of the first determination signal Sig1 and the second determination signal Sig2 become H before the control signal GUH is switched from the on-command to the off-command. When determined that the logic levels of the first determination signal Sig1 and the second determination signal Sig2 do not become H, the drive control unit 41 determines that the drain current Id flowing to the U-phase second upper arm switch SUHB during the on-operation period of the U-phase second upper arm switch SUHB does not exceed the threshold current Ith. Then, the drive control unit 41 proceeds to step S34 and maintains the U-phase second upper arm switch SUHB as the on-operation target that is used the next time the on-command is received. Meanwhile, when determined at steps S30 and S32 that the logic levels of the first determination signal Sig1 and the second determination signal Sig2 have become H before the control signal GUH is switched from the on-command to the off-command, the drive control unit 41 determines that the drain current Id flowing to the U-phase second upper arm switch SUHB during the on-operation period of the U-phase second upper arm switch SUHB has changed in an increasing manner and exceeds the threshold current Ith. Then, the drive control unit 41 proceeds to step S36 and waits until the control signal GUH is switched from the on-command to the off-command.

When determined YES at step S36, the drive control unit 41 proceeds to step S38. The drive control unit 41 switches the on-operation target that is used the next time the on-command is received from the U-phase second upper arm switch SUHB to the U-phase first upper arm switch SUHA.

When the process at either of steps S38 and S34 is completed, the drive control unit 41 proceeds to step S40. The drive control unit 41 switches the U-phase second upper arm switch SUHB to the off state by the discharge process. At step S40, the drive control unit 41 also instructs the first sample-and-hold circuit 93 and the second sample-and-hold circuit 97 to perform a reset. As a result, each time, the first determination signal Sig1 outputted from the first sample-and-hold circuit 93 becomes the output signal of the first comparator 91. Each time, the second determination signal Sig2 outputted from the second sample-and-hold circuit 97 becomes the output signal of the second comparator 95.

Meanwhile, when determined that the control determined at step S26 is the overmodulation control or the rectangular wave control, the drive control unit 41 proceeds to step S42. At step S42, the drive control unit 41 ignores the selection of the U-phase second upper arm switch SUHB as the on-operation target and switches the U-phase first upper arm switch SUHA to the on-state by the charge process.

At subsequent step S44, the drive control unit 41 switches the on-operation target that is used the next time the on-command is received from the U-phase second upper arm switch SUHB to the U-phase first upper arm switch SUHA. The processes at steps S26, S42, and S44 are provided to prevent decrease in the reliability of the U-phase second upper arm switch SUHB.

That is, the numbers of switching operations that are performed in the overmodulation control and the rectangular control are fewer than the number of switching operations performed in the sine-wave PWM control. Therefore, in the overmodulation control, controllability of the current flowing to the switching element decreases compared to that in the sine-wave PWM control. A concern arises in that the current flowing to the switching element may significantly exceed a command current based on the torque command value Trq*. Therefore, in the case in which the overmodulation control is selected, when the U-phase second upper arm switch SUHB is turned on, the current flowing to the U-phase second upper arm switch SUHB may exceed the second current capacity Ib as a result of the decrease in current controllability. Furthermore, in the overmodulation control and the rectangular wave control, because the number of switching operations is fewer than that in the sine-wave PWM control, the amount of time from when the current on-command is received until the next on-command is received is longer than that in the sine-wave PWM control. Therefore, even should a situation in which the current flowing to the U-phase second upper arm switch SUHB may exceed the second current capacity Ib occur, switching of the on-operation target to the U-phase first upper arm switch SUHA that has a larger current capacity may not be promptly performed. The processes at step S26, S42, and S44 are provided to counter this issue.

At subsequent step S46, the drive control unit 41 waits until the control signal GUH is switched from the on-command to the off-command. When determined YES at step S46, the drive control unit 41 proceeds to step S48 and switches the U-phase first upper arm switch SUHA to the off-state by the discharge process.

Next, the switching process will be further described with reference to FIG. 12. In the series of processes shown in FIG. 12, first, at step S50, the drive control unit 41 determines whether or not the control signal GUH has been switched from the off-command to the on-command.

When determined at step S50 that the control signal GUH has switched from the off-command to the on-command, the drive control unit 41 proceeds to step S52. The drive control unit 41 determines whether or not the on-operation target that had been selected when the on-command had been previously inputted is the U-phase first upper arm switch SUHA.

When determined at step S52 that the on-operation target is the U-phase first upper arm switch SUHA, at steps S54 and S56, the drive control unit 41 determines whether or not the logic levels of the third determination signal Sig3 and the fourth determination signal Sig4 become H before the control signal GUH is switched from the on-command to the off-command. When determined that the logic levels do not become H, the drive control unit 41 determines that the collector current Ic flowing to the U-phase upper arm switch SUHA during the on-operation period of the U-phase first upper arm switch SUHA has changed in a decreasing manner and fallen below the threshold voltage Ith. Then, the drive control unit 41 proceeds to step S58 and increments a determination count Nr by 1. The initial value of the determination count Nr is 0.

Meanwhile, when determined at steps S54 and S56 that the logic levels of the third determination signal Sig3 and the fourth determination signal Sig4 have become H before the control signal GUH is switched from the on-command to the off-command, the drive control unit 41 proceeds to step S60. At step S60, the drive control unit 41 waits until the control signal GUH is switched from the on-command to the off-command. When determined YES at step S60, the drive control unit 41 proceeds to step S62. The drive control unit 41 maintains the U-phase first upper arm switch SUHA as the on-operation target that is used the next time the on-command is received. Then, the drive control unit 41 resets the determination count Nr to 0.

Meanwhile, upon completion of the process at step S58, the drive control unit 41 proceeds to step S64. The drive control unit 41 determines whether or not the determination count Nr is equal to or greater than a prescribed count Nα (≥2). The process at step S64 is provided to accurately ascertain the likelihood of the current that flows when the next on-command is received becoming equal to or lower than the threshold current Ith, and determine the on-operation target.

When determined NO at step S64, i.e., Nr≥Nα is false, the drive control unit 41 proceeds to step S66. The drive control unit 41 maintains the U-phase first upper arm switch SUHA as the on-operation target that is used the next time the on-command is received. Meanwhile, when determined YES at step S64, i.e., Nr≥Nα is true, the drive control unit 41 proceeds to step S68. The drive control unit 41 switches the on-operation target that is used the next time the on-command is received from the U-phase first upper arm switch SUHA to the U-phase second upper arm switch SUHB.

After completing the process at step S62, S66, or S68, the drive control unit 41 proceeds to step S70. The drive control unit 41 switches the U-phase first upper arm switch to the off-state by the discharge process. At step S70, the drive control unit 41 also instructs the third sample-and-hold circuit 103 and the fourth sample-and-hold circuit 107 to perform a reset. As a result, the third determination signal Sig3 outputted from the third sample-and-hold circuit 103 becomes the output signal of the third comparator 101 at each time. The fourth determination signal Sig4 outputted from the fourth sample-and-hold circuit 107 becomes the output signal of the fourth comparator 105 at each time.

Figure 13:
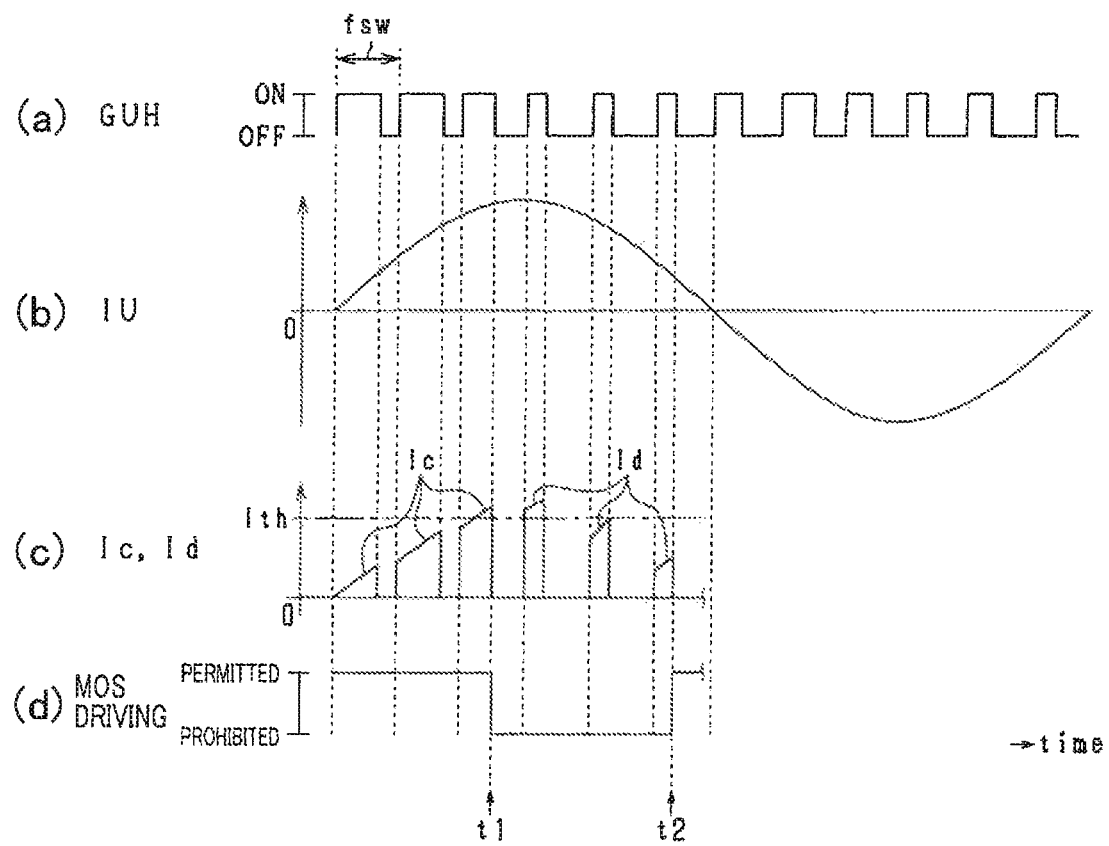
FIG. 13 is a time chart of an example of the switching process.

FIG. 13 shows an example of the switching process according to the present embodiment. Here, FIG. 13 shows: (a) a transition of the control signal (GUH; (b) a transition of a U-phase current IU; (c) a transition of the collector current Ic or the drain current Id; and (d) a transition of whether or not driving of the U-phase second upper arm switch SUHB is prohibited. In FIG. 13, fsw indicates a single switching period. In addition, according to the present embodiment, the period between temporally adjacent first and second timings at which switching to the on-command is performed corresponds to a "determination period", where the first timing refers to a timing at which switching to the on-command is performed, as shown in FIG. 13 by (a), and the second timing refers to a timing at which switching to the on-command is performed following the switching at the first timing. According to the present embodiment, the determination period is the same period as a single switching period fsw.

In the example shown in FIG. 13, each time the control signal GUH is switched from the on-command to the off-command, a determination is made regarding whether the on-operation target that is used the next time the on-command is received is the U-phase first upper arm switch SUHA or the U-phase second upper arm switch SUHB. Here, before time t1, the logic levels of the third determination signal Sig3 and the fourth determination signal Sig4 are determined to be H. As a result, at time t1, the next on-operation target is determined to be the U-phase first upper arm switch SUHA. The next on-operation of the U-phase second upper arm switch SUHB is prohibited.

Subsequently, as a result of the determination count Nr being determined to have reached the prescribed count Nα, at time t2, the next on-operation target is determined to be the U-phase second upper arm switch SUHB. The next on-operation of the U-phase second upper arm switch SUHB is permitted. FIG. 13 shows an example in which the prescribed count Nα is set to 3.

As described above, according to the present embodiment, even if a situation occur in which the switch for the on-operation target should be changed during the on-operation period of either of the U-phase first upper arm switch SUHA and the U-phase second upper arm switch SUHB based on the current on-command, switching is delayed until the next on-command is received. Therefore, occurrence of variations in phase current accompanying the switching of the on-operation target can be prevented. Decrease in current controllability can be prevented.

Figure 14:
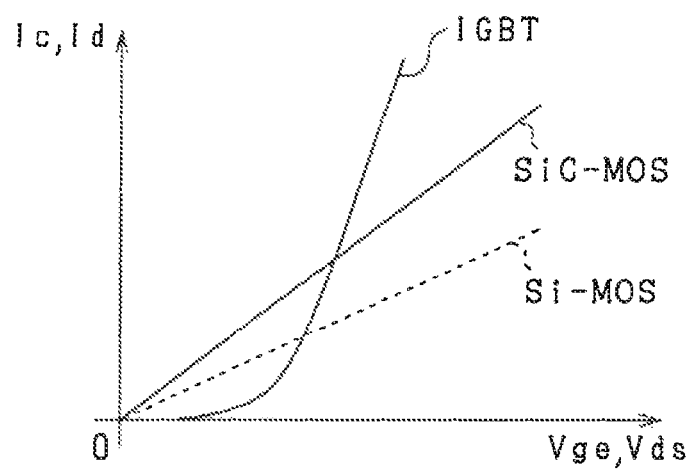
FIG. 14 is a diagram of current-voltage characteristics of an SiC-MOSFET and an Si-MOSFET.

According to the present embodiment, the SiC-MOSFETs are used as the second switches SUHB, SULB, SVHB, SVLB, SWHB, and SWLB, as described above. As shown in FIG. 14, the SiC-MOSFET has a lower on-resistance than the Si-MOSFET, and the threshold current Ith can be increased. As a result, loss occurring in the inverter 20 can be further reduced. Meanwhile, the SiC-MOSFET has lower capability regarding current capacity and the like, compared to the Si-MOSFET.

Second Embodiment

Figure 15:
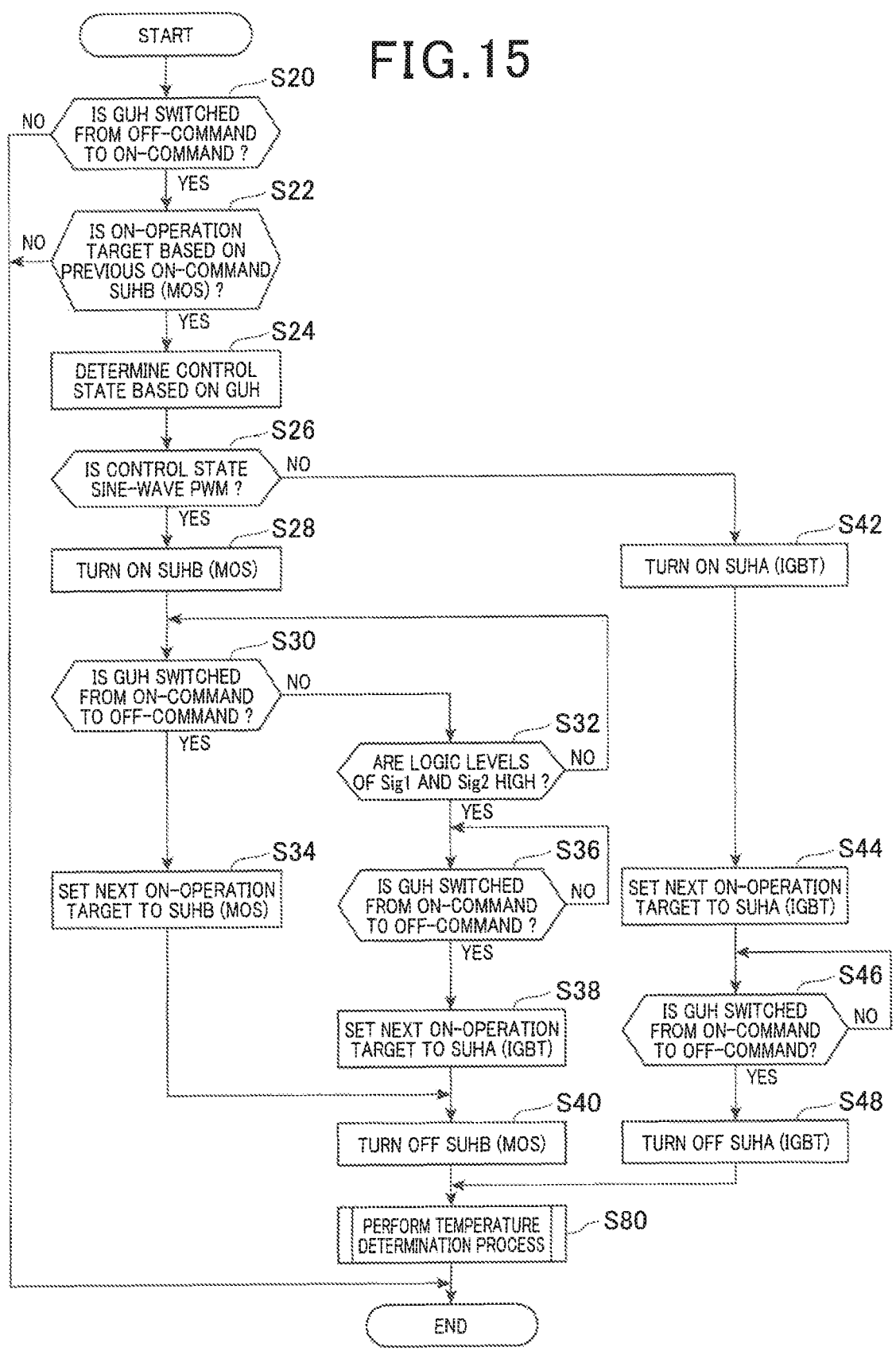
FIG. 15 is a flowchart of the steps in a switching process according to a second embodiment.
Figure 16:
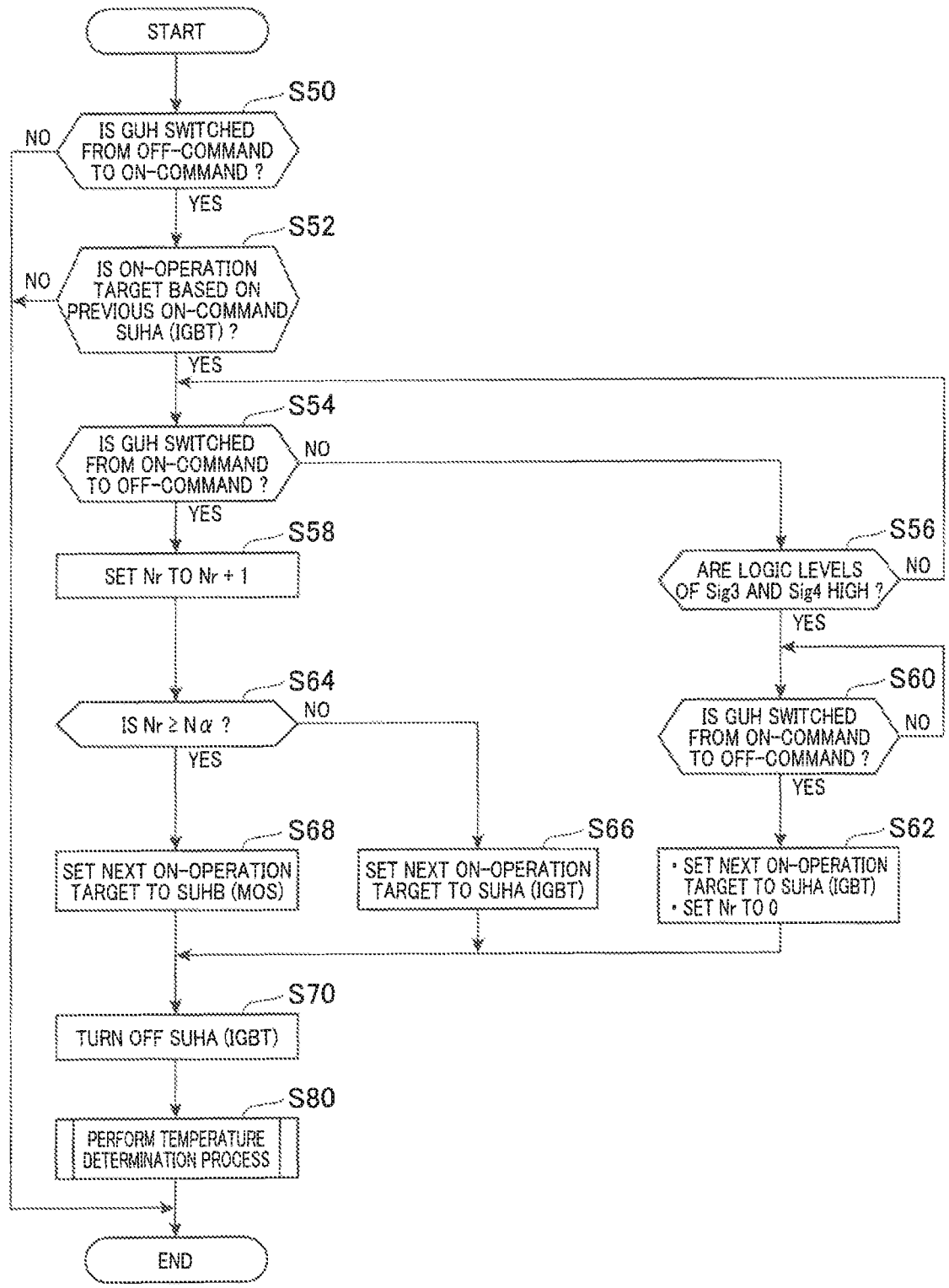
FIG. 16 is a flowchart of the steps in the switching process.

A second embodiment will hereinafter be described with reference to the drawings. The differences with the above-described first embodiment will mainly be described. According to the present embodiment, as shown in FIGS. 15 and 16, the method of the switching process is modified. Processes in FIGS. 15 and 16 that are identical to the processes in FIGS. 9 and 12, described above, will be given the same step numbers for convenience.

As shown in FIG. 15, after completing the process at step S40 or S48, the drive control unit 41 proceeds to step S80 and performs a temperature determination process. In addition, as shown in FIG. 16, after completing the process at step S70, the drive control unit 41 proceeds to step S80 and performs the temperature determination process.

Figure 17:
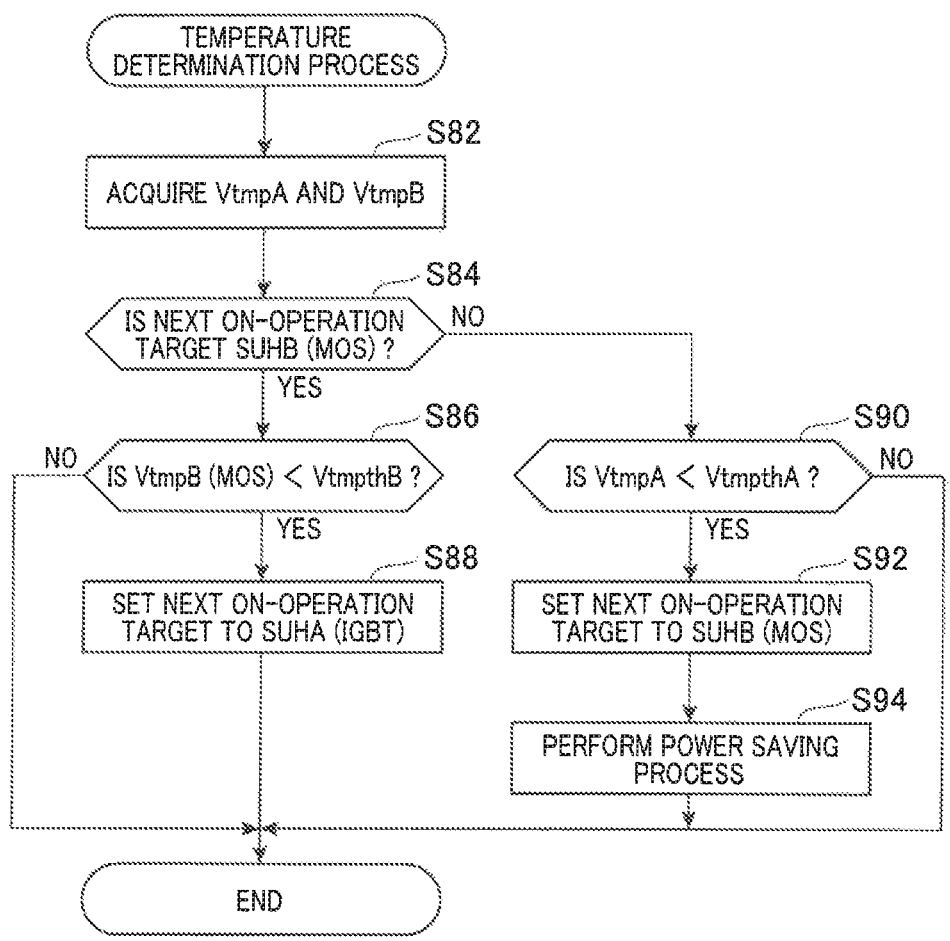
FIG. 17 is a flowchart of the steps in a temperature determination process.

FIG. 17 shows the steps in the temperature determination process. The process is performed by the drive control unit 41.

In the series of processes, first, at step S82, the drive control unit 41 acquires a first temperature signal VtmpA and a second temperature signal VtmpB. According to the present embodiment, the first temperature signal VtmpA corresponds to a "first temperature detection value" and the second temperature signal VtmpB corresponds to a "second temperature detection value."

At subsequent step S84, the drive control unit 41 determines whether or not the on-operation target that is used the next time the on-command is received is the U-phase second upper arm switch SUHB When determined at step S84 that the on-operation target is the U-phase second upper arm switch SUHB, the drive control unit 41 proceeds to step S86. The drive control unit 41 determines whether or not the second temperature signal VtmpB falls below a second temperature threshold VtmpthB. The process at step S86 is performed to determine whether or not the U-phase second upper arm switch SUHB is in an overheating state. According to the present embodiment, the second temperature threshold VtmpthB is set to the second temperature signal VtmpB when the temperature of the U-phase second upper arm switch SUHB is at an allowable upper-limit temperature that enables the reliability of the U-phase second upper arm switch SUHB to be maintained.

When determined YES at step S86, the drive control unit 41 determines that the temperature of the U-phase second upper arm switch SUHB exceeds the allowable upper-limit temperature thereof. The drive control unit 41 then proceeds to step S88. At step S88, the drive control unit 41 switches the on-operation target that is used the next time the on-command is received from the U-phase second upper arm switch SUHB to the U-phase first upper arm switch SUHA. Meanwhile, when determined NO at step S86, the drive control unit 41 maintains the on-operation target that has been selected earlier, as is.

For example, a situation in which the drive control unit 41 makes a YES determination at step S86 may occur when, after a vehicle travels on an uphill road in a state in which the torque command value Trq* is large and the U-phase first upper arm switch SUHA is selected as the on-operation target, the vehicle travels downhill and the torque command value Trq* rapidly decreases.

Meanwhile, when determined at step S84 that the on-operation target is the U-phase first upper arm switch SUHA, the drive control unit 41 proceeds to step S90. The drive control unit 41 determines whether or not the first temperature signal VtmpA falls below a first temperature threshold VtmpthA. The process at step S90 is performed to determine whether or not the U-phase first upper arm switch SUHA is in an overheating state. According to the present embodiment, the first temperature threshold VtmpthA is set to the first temperature signal VtmpA when the temperature of the U-phase first upper arm switch SUHA is at an allowable upper-limit temperature that enables the reliability of the U-phase first upper arm switch SUHA to be maintained.

When determined YES at step S90, the drive control unit 41 determines that the temperature of the U-phase first upper arm switch SUHA exceeds the allowable upper-limit temperature thereof. The drive control unit 41 then proceeds to step S92. At step S92, the drive control unit 41 switches the on-operation target that is used the next time the on-command is received from the U-phase first upper arm switch SUHA to the U-phase second upper arm switch SUHB. Meanwhile, when determined NO at step S90, the drive control unit 41 maintains the on-operation target that has been selected earlier, as is.

After completing the process at step S92, at subsequent step S94, the drive control unit 41 performs a power saving process. In the power saving process, an instruction to reduce the torque command value Trq* is given. Specifically, the drive control unit 41 transmits a command for power saving to the motor control apparatus 40 via the ninth terminal C9. The motor control apparatus 40 transmits the command for power saving to the high-order control apparatus 50. As a result, the high-order control apparatus 50 reduces the torque command value Trq*

According to the present embodiment described above, in addition to the effects achieved according to the above-described first embodiment, an effect can be achieved in which use of the U-phase first upper arm switch SUHA or the U-phase second upper arm switch in an overheating state can be prevented.

Third Embodiment

A third embodiment will hereinafter be described with reference to the drawings. The differences with the above-described first embodiment will mainly be described. According to the present embodiment, a reverse conducting (RC)-IGBT is used as each of the first switches configuring the inverter 20. The RC-IGBT is a reverse conducting switching element.

Figure 18:
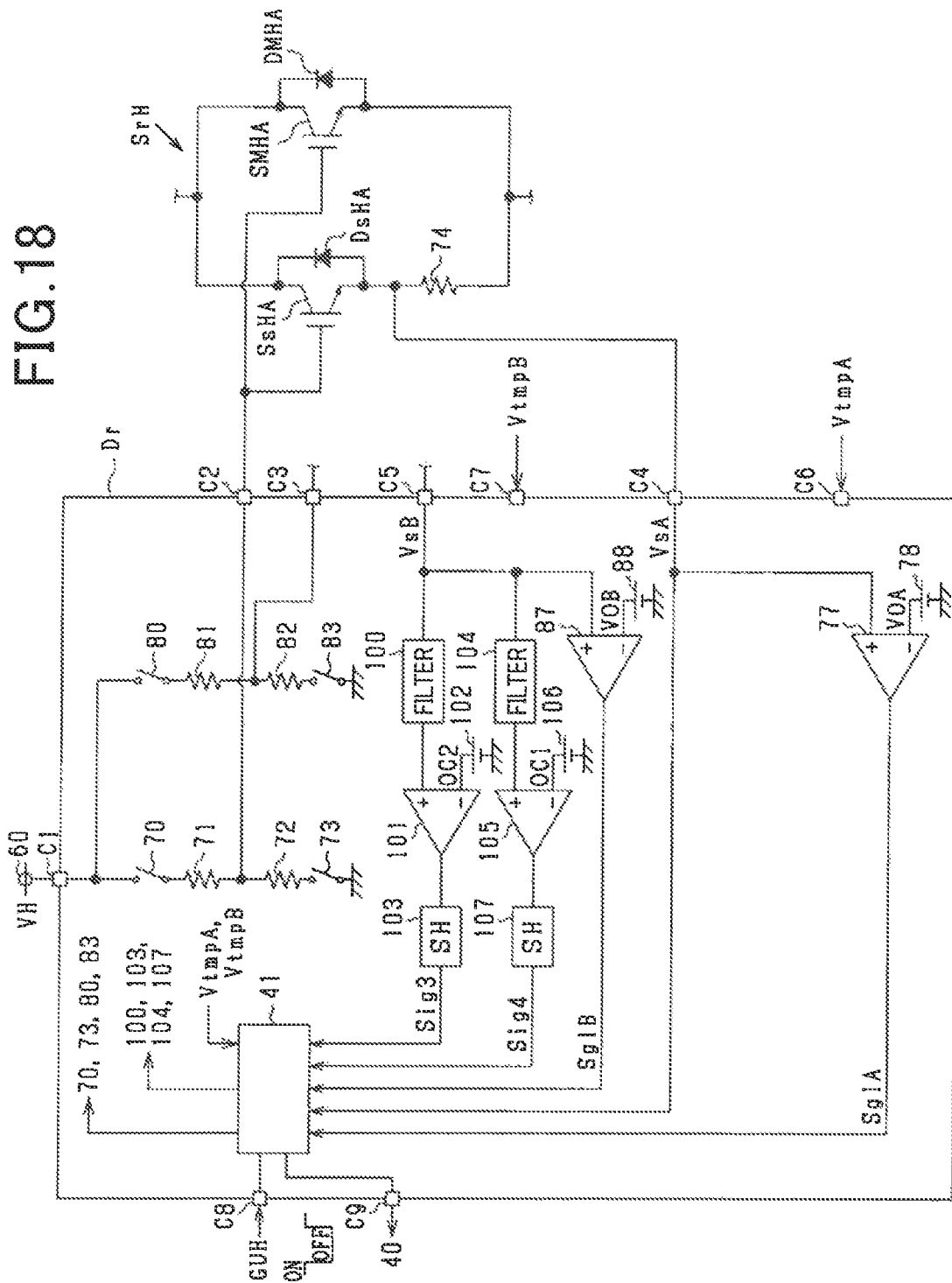
FIG. 18 is a diagram of a configuration of a drive circuit and the periphery thereof according to a third embodiment.

FIG. 18 shows a configuration of the drive circuit Dr and the periphery thereof according to the present embodiment. The configurations of the drive circuits Dr corresponding to the switch units 20UH to 20WL and the peripheries thereof according to the present embodiment are basically the same. Therefore, an example of the drive circuit Dr corresponding to the U-phase upper arm switch unit 20UH will mainly be described hereafter. FIG. 18 shows a configuration corresponding to the U-phase upper arm switch unit 20UH. Configurations in FIG. 18 that are identical to the configurations in FIG. 4, described above, will be given the same reference numbers for convenience. In addition, in FIG. 18, a portion of the configuration of the drive circuit Dr and the periphery thereof, such as the U-phase second upper arm switch SUHB and the temperature-sensitive diodes 75 and 85, are omitted.

A U-phase first upper arm switch SrH is an RC-IGBT that includes an upper arm main switch SMHA, an upper arm main diode DMHA, an upper arm sense switch SsHA, and an upper arm sense diode DsHA on a single chip. The upper arm main diode DMHA is connected in inverse parallel to the upper arm main switch SMHA. The upper arm sense diode DsHA is connected in inverse parallel to the upper arm sense switch SsHA.

A collector of the upper arm main switch SMHA and a collector of the upper arm sense switch SsHA are connected. An emitter of the upper arm sense switch SsHA is connected to an emitter of the upper arm main switch SMHA via the first sense resistor 74. The fourth terminal C4 is connected to the connection point between the first sense resistor 74 and the upper arm sense switch SsHA. The second terminal C2 is connected to the respective gates of the upper arm main switch SMHA and the upper arm sense switch SsHA.

Figure 19A:
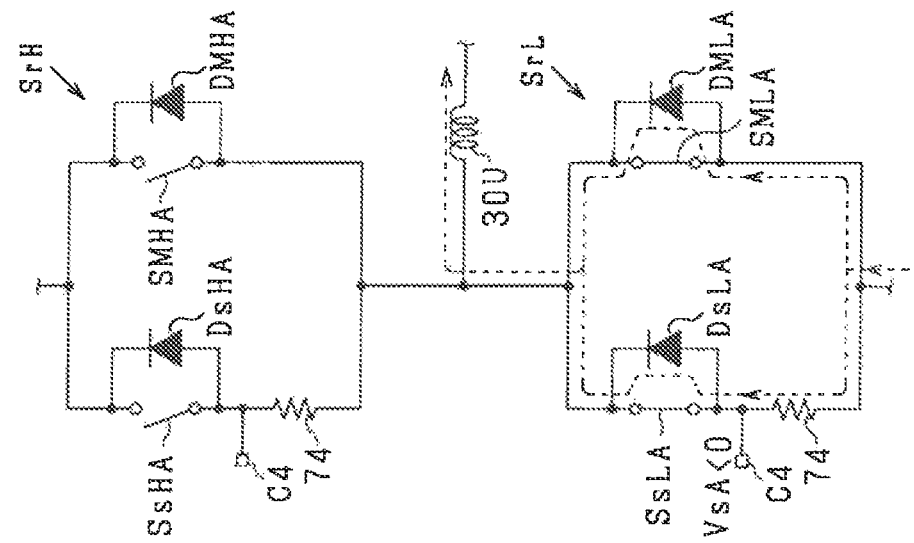
FIGS. 19A and 19B are diagrams of a current path flowing to an own arm and an opposing arm.
Figure 19B:
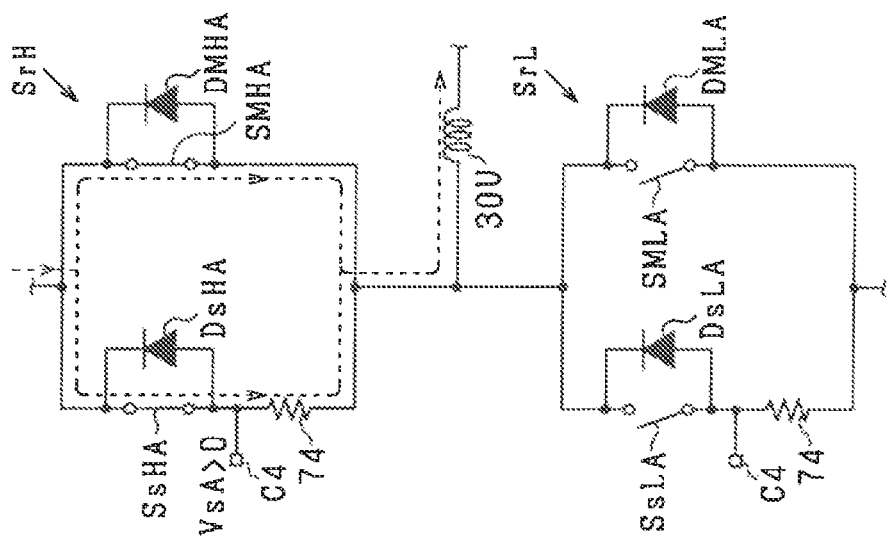

A sense voltage that can be detected by the RC-IGBT will be described with reference to FIGS. 19A and 19B. FIGS. 19A and 19B show a configuration of the U phase among the phases. In addition, an RC-IGBT that configures the U-phase lower arm switch unit 20UL is shown to be a U-phase first lower arm switch SrL. According to the present embodiment, the U-phase first lower arm switch SrL has the same configuration as the U-phase first upper arm switch SrH. The U-phase first lower arm switch SrL includes a lower arm main switch SMLA, a lower arm main diode DMLA, a lower arm sense switch SsLA, and a lower arm sense diode DsLA. In the examples shown in FIG. 19A and FIG. 19B, the upper arm main switch SMHA corresponds to a "first own arm switch." The lower arm main switch SMLA corresponds to a "first opposing arm switch." Therefore, the U-phase second upper arm switch SUHB (not shown) corresponds to a "second own arm switch" and the U-phase second lower arm switch SULB (not shown) corresponds to a "second opposing arm switch."

As shown in FIG. 19A, when the U-phase first upper arm switch SrH is turned on, the collector current flows to the upper arm main switch SMHA. In this case, a minute current that has a positive correlation with the collector current is outputted from the upper arm sense switch SsHA. The current flows from the upper arm sense switch SsHA to the first sense resistor 74. As a result, voltage drop occurs in the first sense resistor 74. In this case, the first sense voltage VsA is a positive value.

Meanwhile, as shown in FIG. 19B, when the U-phase first upper arm switch SrH is turned off, a forward-direction current flows to the lower arm main diode DMLA. In this case, a minute current that has a positive correlation with the forward-direction current flows from the first sensor resistor 74 to the lower arm sense diode DsLA. As a result, voltage drop occurs in the first sense resistor 74. In this case, the first sense voltage VsA becomes a negative value. FIG. 19B shows an example in which the U-phase first lower arm switch SrL is turned on.

Next, FIG. 20 shows the steps in a switching process according to the present embodiment. According to the present embodiment, the drive circuit Dr corresponding to the U-phase upper arm switch unit 20UH, among the upper arm switch units 20UH, 20VH, and 20WH of the three phases, will be described as an example. This process corresponds to the process in FIG. 12, described above, and is repeatedly performed by the drive control unit 41 at, for example, a predetermined period. Processes in FIG. 20 that are identical to the processes in FIG. 12, described above, will be given the same step numbers for convenience.

In the series of processes, first, at step S100, the drive control unit 41 determines whether or not the U-phase first upper arm switch is turned on.

When determined YES at step S100, the drive control unit 41 proceeds to step S102, and waits until the control signal GUH is switched from the on-command to the off-command. When determined YES at step S102, the drive control unit 41 proceeds to step S104, and switches the U-phase first upper arm switch SrH to the off-state by the discharge process.

At subsequent steps S106, S108, and S110, the drive control unit 41 determines whether or not an absolute value of the first sense voltage VsA of the opposing arm acquired at step S106 becomes equal to or less than the steady-state threshold OC1 before the control signal GUH is switched from the off-command to the on-command. The first sense voltage VsA of the U-phase first lower arm switch SrL of the opposing arm gradually decreases until the control signal GUH is switched to the on-command. When the gradually decreasing first sense voltage VsA of the opposing arm does not become equal to or lower than the steady-state threshold OC1 before the control signal GUH of the own arm is switched to the on-command, the drive control unit 41 determines that the switch to be the on-operation target at the next on-command of the own arm is the U-phase first upper arm switch SrH. Here, the first sense voltage VsA of the opposing arm during the off-operation period of the own arm tends to increase as the collector current flowing during the on-operation period of the own arm immediately before the off-operation period increases. Therefore, according to the present embodiment, the first sense voltage VsA of the opposing arm during the off-operation period of the own arm corresponds to a "second current detection value" that is correlated with the collector current that flows during the on-operation period of the own arm immediately before the off-operation period.

When determined that the absolute value of the first sense voltage VsA does not become equal to or less than the steady-state threshold OC1, the drive control unit 41 determines that the phase current flowing to the U-phase winding 30U exceeds the threshold current Ith before the next time the on-command is received. The drive control unit 41 proceeds from steps S108 to S112. At step S112, the drive control unit 41 switches the U-phase first upper arm switch SrH that is selected as the on-operation target to the on-state by the charge process. Then, the drive control unit 41 resets the determination count Nr to 0.

Meanwhile, when determined that the absolute value of the first sense voltage VsA becomes equal to or less than the steady-state threshold OC1, the drive control unit 41 determines that the phase current flowing to the U-phase winding 30U becomes equal to or lower than the threshold current Ith before the next time the on-command is received. The drive control unit 41 proceeds from step S110 to step S58. Subsequently, the drive control unit 41 proceeds to step S64.

When determined NO at step S64, i.e., Nr≥Nα is false, the drive control unit 41 proceeds to step S114, and maintains the U-phase first upper arm switch SrH as the on-operation target that is used the next time the on-command is received. At subsequent step S116, the drive control unit 41 waits until the control signal GUH is switched from the off-command to the on-command. When determined YES at step S16, the drive control unit 41 proceeds to step S118, and switches the U-phase first upper arm switch SrH to the on-state by the charge process.

Meanwhile, when determined YES at step S64, i.e., Nr≥Nα is true, the drive control unit 41 proceeds to step S120, and switches the on-operation target that is used the next time the on-command is received from the U-phase first upper arm switch SrH to the U-phase second upper arm switch SUHB. At subsequent step S122, the drive control unit 41 waits until the control signal GUH is switched from the off-command to the on-command. When determined YES at step S122, the drive control unit 41 proceeds to step S124, and switches the U-phase second upper arm switch SUHB to the on-state by the charge process.

The current that flows to the lower arm sense diode DsLA during the off-operation periods of the U-phase first upper arm switch SrH and the U-phase second upper arm switch SUHB has a timing similar to an input start timing of the next on-command on the own arm side. Therefore, determination accuracy regarding whether or not the likelihood of the current that flows the next time the on-command is received being equal to or lower than the threshold current Ith is high can be improved through use of the current that flows to the lower arm sense diode DsLA. Consequently, according to the present embodiment, whether or not the likelihood of the current that flows the next time the on-command is received being equal to or lower than the threshold current Ith is high can be accurately determined, and the on-operation target can thereby be selected.

Other Embodiments

The above-described embodiments may be modified in the following manner.

Figure 21:
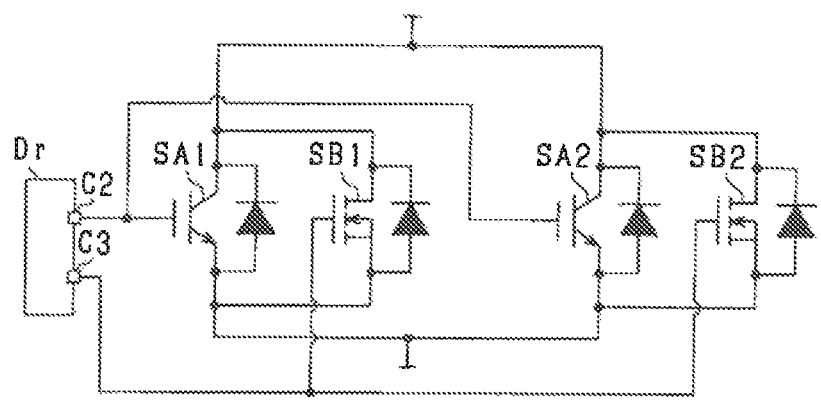
FIG. 21 is a diagram of a switching unit according to another embodiment.

According to the above-described first embodiment, the switch unit includes a single MOSFET and a single IGBT. However, the present disclosure is not limited thereto. For example, the switch unit may include a plurality of MOSFETs and a plurality of IGBTs. Here, FIG. 21 shows an example of a configuration in which the switch unit includes two MOSFETs (SB1 and SB2) and two IGBTs (SA1 and SA2).

In addition, the number of MOSFETs and the number of IGBTs included in the switch unit are not limited to being the same and may differ.

According to the above-described first embodiment, the condition that the logic level of the first determination signal Sig1 is H may be eliminated from the process at step S32 in FIG. 9. That is, the transient characteristics Pr2 shown in FIG. 7, described above, may not be used. In this case, the first filter 90, the first comparator 91, the first power supply 92, and the first sample-and-hold circuit 93 may be eliminated from the drive circuit Dr.

In a similar manner, the condition that the logic level of the third determination signal Sig3 is H may be eliminated from the process at step S56 in FIG. 12. In this case, the third filter 100, the third comparator 101, the third power supply 102, and the third sample-and-hold circuit 103 may be eliminated from the drive circuit Dr.

According to the above-described first embodiment, the process at step S64 in FIG. 12 may be eliminated. In this case, the drive control unit 41 may proceed to step S68 after completing step S58.

In FIG. 4 according to the above-described first embodiment, the output voltage of the second power supply 96 may be set to the first sense voltage VsA when the collector current Ic that flows to the U-phase first upper arm switch SUHA is lower than the threshold current Ith. In addition, the output voltage of the fourth power supply 106 may be set to the second sense voltage VsB when the drain current Id that flows to the U-phase second upper arm switch SUHB is higher than the threshold current Ith and lower than the second current capacity Ib. Thus, the "first threshold" and the "second threshold" are differing values.

The overmodulation control or the rectangular wave control may be eliminated from the three control states performed by the motor control apparatus 40. In addition, the method for determining the control state is not limited to the method described regarding step S24 in FIG. 9, described above. For example, the configuration may be changed to a configuration in which information on the control state is transmitted from the motor control apparatus 40 to the drive circuit Dr. The method may be such that the drive control unit 41 of the drive circuit Dr determines the control state based on the transmitted information.

The motor control apparatus 40 itself may generate the torque command value Trq*, instead of the high-order control apparatus 50. In addition, the high-order control apparatus may generate the control signals, instead of the motor control apparatus 40.

The switching elements that configure the switch unit are not limited to a combination of the IGBT and the MOSFET. For example, an Si-MOSFET can be used as the switching element, instead of the SiC-MOSFET.

The current flowing to the switching element may be detected by, for example, a current detecting unit that is capable of directly detecting a current flowing on a current path connected to the collector or the emitter, instead of the current detecting unit that includes a sense terminal and a sense resistor.

The temperature detecting unit that detects the temperature of the switching element is not limited to the temperature-sensitive diode and, for example, may be a thermistor.

The motor generator is not limited to the permanent-magnet synchronous motor and, for example, may be a wound-field synchronous motor. In addition, the motor generator is not limited to the synchronous motor and, for example, may be an induction motor. Furthermore, the motor generator is not limited to that used as an onboard main machine and may be that used for other purposes, such as an electric machine configuring an electric power steering apparatus or an electric compressor for air-conditioning. Moreover, the number of phases of the motor generator may be other than three.

The apparatus that includes the switching elements is not limited to a power conversion circuit such as an inverter.

The exemplary embodiment described above may be modified as follows.

(First Modification)

The first switching process may be a process in which, under a condition that, when the first switching element is turned on based on a current on-command, the first current detection value during an on-operation period of the first switching element is determined to have changed in a decreasing manner and falls below the first threshold, the on-operation target that is used the next time the on-command is received is switched from the first switching element to the second switching element, without the on-operation target being switched from the first switching element to the second switching element during a period during which the on-command is currently being inputted.

The second switching process may be a process in which, under a condition that, when the second switching element is turned on based on the current on-command, the second current detection value during an on-operation period of the second switching element is determined to have changed in an increasing manner and exceeds the second threshold, the on-operation target that is used the next time the on-command is received is switched from the second switching element to the first switching element, without the on-operation target being switched from the second switching element to the first switching element during the period during which the on-command is currently being inputted.

In the present modification, the operating unit determines whether or not, when the first switching element is turned on based on the current on-command, the first current detection value during the on-operation period of the first switching element has changed in a decreasing manner and falls below the first threshold. The state in which the first current detection value falls below the first threshold during the on-operation period is a state in which the likelihood is high that the current that flows when the next on-command is received will be equal to or lower than the threshold current. Therefore, the operating unit switches the next on-operation target to the second switching element that has a lower on-resistance than the first switching element in the low-current region, if the first current detection value is determined to fall below the first threshold.

Meanwhile, the operating unit determines whether or not, when the second switching element is turned on based on the current on-command, the second current detection value during the on-operation period of the second switching element has changed in an increasing manner and exceeds the second threshold. The state in which the second current detection value exceeds the second threshold during the on-operation period is a state in which the likelihood is high that the current that flows when the next on-command is received will be equal to or higher than the threshold current. Therefore, the operating unit switches the next on-operation target to the first switching element that has a lower on-resistance than the second switching element in the high-current region, if the second current detection value is determined to exceed the second threshold.

(Second Modification)

The first switching element may be a first own arm switch and the second switching element is a second own arm switch. A parallel-connection body configured by a first opposing arm switch and a second opposing arm switch may be connected in series to a parallel connection body configured by the first own arm switch and the second own arm switch. Diodes are respectively connected in inverse parallel to the first opposing arm switch and the second opposing arm switch. The operating unit may alternately turn on either of the first own arm switch and the second own arm switch, and at least either of the first opposing arm switch and the second opposing arm switch, under a condition that at least either of the first own arm switch and the second own arm switch, and at least either of the first opposing arm switch and the second opposing arm switch are not simultaneously turned on. The current acquiring unit may acquire a current that flows to the diode during the off-operation period of the first arm switch and the second arm switch as the first current detection value. The first switching process may be a process in which, under a condition that the first current detection value acquired during a period from reception of the off-command for the first own arm switch and the second arm switch to next time the on-command of the first own arm switch and the second own arm switch is inputted is determined to fall below the first threshold value, the on-operation target performed the next time the on-command for the first own arm switch and the second arm switch is inputted is switched from the first own arm switch to the second own arm switch.

In the present modification, a current flows to the diodes that are respectively connected in inverse parallel to the first and second opposing arm switches during the off-operation periods of the first and second own arm switches. The current flowing to the diodes during the off-operation periods of the first and second own arm switches is a current that has a timing similar to an input start timing of the next on-command. Therefore, determination accuracy regarding whether or not the likelihood of the current that flows the next time the on-command is received being equal to or lower than the threshold current is high can be improved through use of the current that flows to the diodes during the off-operation periods of the first and second own arm switches.

Here, in the present modification, the on-operation target that is used the next time the on-command is received is switched from the first own arm switch to the second own arm switch, under a condition that the first current detection value acquired during a period from the reception of the off-command for the first and second arm switch to the next time the on-command for the first and second arm switch is inputted is determined to fall below the first threshold. As a result of the present modification described above, whether or not the likelihood of the current that flows the next time the on-command is received being equal to or lower than the threshold current is high can be accurately determined, and the on-operation target can thereby be selected.

(Third Modification)

A current capacity of the second switching element may be set to be less than a current capacity of the first switching element and greater than the threshold current. The operating unit may forcibly turn off the first switching element when determined that, when the first switch is turned on based on the current on-command, the first current detection value is equal to or greater than an overcurrent threshold that is equal to or less than the current capacity of the first switching element and greater than the current capacity of the second switching element.

In the present modification, the current capacity of the second switching element is set to be less than the current capacity of the first switching element and greater than the threshold current. To prevent decrease in the reliability of the second switching element in the high-current region, the operating unit switches the next on-operation target from the second switching element to the first switching element, under a condition that the second current detection value is determined to exceed the second threshold that is equal to or greater than the threshold current during the on-operation period of the second switching element.

In addition, in the present modification, the operating unit forcibly turns off the first switching element when the first current detection value is determined to be equal to or less than the above-described overcurrent threshold during the on-operation period of the first switching element. In the present modification, the second switching element that has a lower current capacity than the first switching element is not turned on in the high-current region. Therefore, even should a time lag occur between when the current detection value is determined to exceed the overcurrent threshold and when the switching element is actually switched to the off-state in the high-current region, decrease in the reliability of the second switching element can be prevented regardless of the time lag.

(Fourth Modification)

The first threshold and the second threshold are each set to the threshold current. The first switching element may be set as the on-operation target in the high-current region. The second switching element may be set as the on-operation target in the low-current region. Therefore, in the present modification, loss in the switching element can be further reduced.

(Fifth Modification)

The present modification may include a temperature acquiring unit that acquires a temperature of the first switching element as a first temperature detection value. The operating unit may switch the on-operation target that is used the next time the on-command is received from the first switching element to the second switching element when determined that the first temperature detection value exceeds an allowable upper-limit temperature thereof, even when the first switching element is selected as the on-operation target that is used the next time the on-command is received.

The temperature of the first switching element may be in an excessively high state, even when the first switching element is selected as the on-operation target that is used the next time the on-command is received. When the first switching element is turned on based on the next on-command in this state, the temperature of the first switching element may be come excessively high, and the reliability of the first switching element may decrease.

Therefore, in the present modification, the next on-operation target is switched from the first switching element to the second switching element when the first temperature detection value is determined to exceed the allowable upper-limit temperature thereof; even when the first switching element is selected as the on-operation target that is used the next time the on-command is received. As a result, decrease in the reliability of the first switching element can be prevented.

(Sixth Modification)

The present modification may include a temperature acquiring unit that acquires a temperature of the second switching element as a second temperature detection value. The operating unit may switch the on-operation target that is used the next time the on-command is received from the second switching element to the first switching element when determined that the second temperature detection value exceeds an allowable upper-limit temperature thereof, even when the second switching element is selected as the on-operation target that is used the next time the on-command is received.

As a result of the present modification, decrease in the reliability of the second switching element can be prevented in a manner similar to that in the fifth modification described above.

(Seventh Modification)

The current capacity of the second switching element may be set to be less than the current capacity of the first switching element and greater than the threshold current. The operating unit may select either of sine-wave pulse width modulation (PWM) control and modulation control that is control in which a number of switching operations of the first switching element and the second switching element performed per predetermined amount of time is less than that in the sine-wave PWM control, and turns on the first switching element or the second switching element. The operating unit may switch the on-operation target that is used the next time the on-command is received from the second switching element to the first switching element when the modulation control is selected, even when the second switching element is selected as the on-operation target that is used the next time the on-command is received.

The number of switching operations in the modulation control is fewer than the number of switching operations in the sine-wave PWM control. Therefore, in the modulation control, controllability of the current flowing to the switching element decreases compared to that in the sine-wave PWM control. The current flowing the switching element may significantly exceed the command value thereof. Therefore, when the second switching element of which the current capacity is set as described above is turned on when the modulation control is selected, ripple in the current flowing to the second switching element increases as a result of the decrease in current controllability. The current flowing to the second switching element may exceed the current capacity thereof. Furthermore, the number of switching operations is fewer in the modulation control than in the sine-wave PWM control. Therefore, the amount of time from the reception of the current on-command to the reception of the next on-command is longer than that in the sine-wave PWM control. Consequently, even should a situation in which the current flowing to the second switching element may exceed the current capacity thereof occur, switching of the on-operation target to the first switching element may not be promptly performed.

Therefore, in the present modification, the operating unit switches the on-operation target that is used the next time the on-command is received from the second switching element to the first switching element when the modulation control is selected, even when the second switching element is selected as the on-operation target that is used the next time the on-command is received. As a result, decrease in the reliability of the second switching element resulting from selection of the modulation control can be prevented.

(Eighth Modification)

A period between a switching timing from the off-command to the on-command and a switching timing from the off-command to the on-command immediately after the foregoing switching timing may be set as a determination period. The second switching process may be a process in which, under a condition that the second current detection value acquired before the next time the on-command is received in each of a plurality of consecutive determination periods is determined to exceed the second threshold, the on-operation target that is used the next time the on-command is received is switched from the second switching element to the first switching element.

In the present modification, the operating unit determines whether or not the second current detection value acquired in each of a plurality of consecutive determination periods exceeds the second threshold. Therefore, the likelihood of the current that flows when the next on-command is received becoming equal to or lower than the threshold current can be accurately ascertained, and the on-operation target can be switched to the first switching element.

What is claimed is:

1. A drive circuit for switching elements that drives a plurality of switching elements connected in parallel to each other, the plurality of switching elements comprising
a first switching element, and
a second switching element that has a lower on-resistance than the first switching element in a low-current region that is a region in which a current is lower than a threshold current, and a higher on-resistance than the first switching element in a high-current region that is a region in which the current is higher than the threshold current, the drive circuit comprising:
an operating unit that turns on either of the first switching element and the second switching element when an on-command is received, and turns off both of the first switching element and the second switching element when an off-command is inputted; and
a current acquiring unit that acquires a current flowing to the first switching element or a correlation value thereof as a first current detection value, and acquires a current flowing to the second switching element or a correlation value thereof as a second current detection value, wherein the operating unit performs
a first switching process in which, under a condition that the first current detection value acquired before next time the on-command is received is determined to fall below a first threshold that is equal to or less than the threshold current, an on-operation target that is used the next time the on-command is received is set to the second switching element, and
a second switching process in which, under a condition that the second current detection value acquired before the next time the on-command is received is determined to exceed a second threshold that is equal to or greater than the threshold current, the on-operation target that is used the next time the on-command is received is set to the first switching element.

2. The drive circuit for switching elements according to claim 1, wherein:

the first switching process is a process in which, under a condition that, when the first switching element is turned on based on a current on-command, the first current detection value during an on-operation period of the first switching element is determined to have changed in a decreasing manner and falls below the first threshold, the on-operation target that is used the next time the on-command is received is switched from the first switching element to the second switching element, without the on-operation target being switched from the first switching element to the second switching element during a period during which the on-command is currently being inputted; and the second switching process is a process in which, under a condition that, when the second switching element is turned on based on the current on-command, the second current detection value during an on-operation period of the second switching element is determined to have changed in an increasing manner and exceeds the second threshold, the on-operation target that is used the next time the on-command is received is switched from the second switching element to the first switching element, without the on-operation target being switched from the second switching element to the first switching element during the period during which the on-command is currently being inputted.

3. The drive circuit for switching elements according to claim 1, wherein:

the first switching element is a first own arm switch and the second switching element is a second own arm switch;

a parallel-connection body configured by a first opposing arm switch and a second opposing arm switch is connected in series to a parallel connection body configured by the first own arm switch and the second own arm switch;

diodes are respectively connected in inverse parallel to the first opposing arm switch and the second opposing arm switch;

the operating unit alternately turns on either of the first own arm switch and the second own arm switch, and at least either of the first opposing arm switch and the second opposing arm switch, under a condition that at least either of the first own arm switch and the second own arm switch, and at least either of the first opposing arm switch and the second opposing arm switch are not simultaneously turned on;

the current acquiring unit acquires a current that flows to the diode during the off-operation period of the first arm switch and the second arm switch as the first current detection value; and the first switching process is a process in which, under a condition that the first current detection value acquired during a period from reception of the off-command for the first own arm switch and the second arm switch to next time the on-command of the first own arm switch and the second own arm switch is inputted is determined to fall below the first threshold value, the on-operation target performed the next time the on-command for the first own arm switch and the second arm switch is inputted is switched from the first own arm switch to the second own arm switch.

4. The drive circuit for switching elements according to claim 1, wherein:

a current capacity of the second switching element is set to be less than a current capacity of the first switching element and greater than the threshold current; and the operating unit forcibly turns off the first switching element when determined that, when the first switch is turned on based on the current on-command, the first current detection value is equal to or greater than an overcurrent threshold that is equal to or less than the current capacity of the first switching element and greater than the current capacity of the second switching element.

5. The drive circuit for switching elements according to claim 1, wherein:

the first threshold and the second threshold are each set to the threshold current.

6. The drive circuit for switching elements according to claim 1, further comprising:

a temperature acquiring unit that acquires a temperature of the first switching element as a first temperature detection value, the operating unit changing the on-operation target that is used the next time the on-command is received from the first switching element to the second switching element when determined that the first temperature detection value exceeds an allowable upper-limit temperature thereof even when the first switching element is selected as the on-operation target that is used the next time the on-command is received.

7. The drive circuit for switching elements according to claim 1, further comprising:

a temperature acquiring unit that acquires a temperature of the second switching element as a second temperature detection value, the operating unit switching the on-operation target that is used the next time the on-command is received from the second switching element to the first switching element when determined that the second temperature detection value exceeds an allowable upper-limit temperature thereof, even when the second switching element is selected as the on-operation target that is used the next time the on-command is received.

8. The drive circuit for switching elements according to claim 1, wherein:

the current capacity of the second switching element is set to be less than the current capacity of the first switching element and greater than the threshold current;

the operating unit selects either of sine-wave pulse width modulation control and modulation control that is control in which a number of switching operations of the first switching element and the second switching element performed per predetermined amount of time is less than that in the sine-wave pulse width modulation control, and turns on the first switching element or the second switching element; and the operating unit switches the on-operation target that is used the next time the on-command is received from the second switching element to the first switching element when the modulation control is selected, even when the second switching element is selected as the on-operation target that is used the next time the on-command is received.

9. The drive circuit for switching elements according to claim 1, wherein:

a period between a switching timing from the off-command to the on-command and a switching timing from the off-command to the on-command immediately after the foregoing switching timing is set as a determination period; and the second switching process is a process in which, under a condition that the second current detection value acquired before the next time the on-command is received in each of a plurality of consecutive determination periods is determined to exceed the second threshold, the on-operation target that is used the next time the on-command is received is switched from the second switching element to the first switching element.

10. A control system comprising:

a plurality of switching elements connected in parallel to each other; and a drive circuit that drives the plurality of switching elements, the plurality of switching elements comprising
- a first switching element, and
- a second switching element that has a lower on-resistance than the first switching element in a low-current region that is a region in which a current is lower than a threshold current, and a higher on-resistance than the first switching element in a high-current region that is a region in which the current is higher than the threshold current, the drive circuit comprising:
- an operating unit that turns on either of the first switching element and the second switching element when an on-command is received, and turns off both of the first switching element and the second switching element when an off-command is inputted; and
- a current acquiring unit that acquires a current flowing to the first switching element or a correlation value thereof as a first current detection value, and acquires a current flowing to the second switching element or a correlation value thereof as a second current detection value, wherein the operating unit performs
- a first switching process in which, under a condition that the first current detection value acquired before next time the on-command is received is determined to fall below a first threshold that is equal to or less than the threshold current, an on-operation target that is used the next time the on-command is received is set to the second switching element, and
- a second switching process in which, under a condition that the second current detection value acquired before the next time the on-command is received is determined to exceed a second threshold that is equal to or greater than the threshold current, the on-operation target that is used the next time the on-command is received is set to the first switching element.

11. A method for driving a plurality of switching elements connected in parallel to each other, the plurality of switching elements comprising
- a first switching element, and
- a second switching element that has a lower on-resistance than the first switching element in a low-current region that is a region in which a current is lower than a threshold current, and a higher on-resistance than the first switching element in a high-current region that is a region in which the current is higher than the threshold current, the method comprising:
- turning on either of the first switching element and the second switching element when an on-command is received;
- turning off both of the first switching element and the second switching element when an off-command is inputted;
- acquiring a current flowing to the first switching element or a correlation value thereof as a first current detection value;
- acquiring a current flowing to the second switching element or a correlation value thereof as a second current detection value;
- performing a first switching process in which, under a condition that the first current detection value acquired before next time the on-command is received is determined to fall below a first threshold that is equal to or less than the threshold current, an on-operation target that is used the next time the on-command is received is set to the second switching element; and
- performing a second switching process in which, under a condition that the second current detection value acquired before the next time the on-command is received is determined to exceed a second threshold that is equal to or greater than the threshold current, the on-operation target that is used the next time the on-command is received is set to the first switching element.

* * * * *